(12) United States Patent
Pabari et al.

(10) Patent No.: US 7,941,385 B2
(45) Date of Patent: *May 10, 2011

(54) METHOD AND APPARATUS FOR MEASUREMENT, ANALYSIS, AND OPTIMIZATION OF CONTENT DELIVERY

(75) Inventors: Vipul J. Pabari, San Diego, CA (US); Robert L. Willis, Encinitas, CA (US); Mark P. Whitehouse, Cardiff By The Sea, CA (US); William G. Wixted, San Diego, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/500,109

(22) Filed: Jul. 9, 2009

(65) Prior Publication Data

US 2009/0268632 A1      Oct. 29, 2009

Related U.S. Application Data

(63) Continuation of application No. 11/198,019, filed on Aug. 4, 2005, now Pat. No. 7,565,336, which is a continuation of application No. 09/850,877, filed on May 7, 2001, now Pat. No. 6,928,471.

(51) Int. Cl.
*G06N 3/00* (2006.01)
*G06E 1/00* (2006.01)
*G06E 3/00* (2006.01)
*G06G 7/00* (2006.01)

(52) U.S. Cl. .......................................... 706/28
(58) Field of Classification Search ...................... 706/28
See application file for complete search history.

(56) References Cited

U.S. PATENT DOCUMENTS

| | | | |
|---|---|---|---|
| 5,313,454 | A | 5/1994 | Bustini et al. |
| 5,726,984 | A | 3/1998 | Kubler et al. |
| 5,761,429 | A | 6/1998 | Thompson |
| 5,787,253 | A | 7/1998 | McCreery et al. |
| 6,269,330 | B1 | 7/2001 | Cidon et al. |
| 6,449,255 | B1 | 9/2002 | Waclawsky |
| 6,606,744 | B1 | 8/2003 | Mikurak |
| 6,671,818 | B1 | 12/2003 | Mikurak |

(Continued)

OTHER PUBLICATIONS

Phrase based browsing for simulation traces of network protocols, Schmidt, N.J.; Kemper, P.; Simulation Conference, 2008. WSC 2008. Winter Digital Object Identifier: 10.1109/WSC.2008.4736401 Publication Year: 2008 , pp. 2811-2819.*

(Continued)

*Primary Examiner* — Michael Holmes
(74) *Attorney, Agent, or Firm* — Pattric J. Rawlins; Procopio Cory Hargreaves & Savitch LLP

(57) ABSTRACT

An apparatus and method for measurement, analysis, and optimization of content delivery over a communications network is presented. In one embodiment, the apparatus detects data packets en route over a communications network. The detected data packets are read by the apparatus, combined into application messages, and further combined into user centric events. The events are analyzed to identify metrics and statistics relating to the delivery of content over a communications network and the experience of the end user. The metrics and statistics are saved in a data storage area. When the metrics exceed a configurable threshold, the apparatus provides real-time notification of content delivery problems or end user experience problems. Alternatively, the system can take action to proactively prevent anticipated content delivery problems or end user experience problems.

18 Claims, 24 Drawing Sheets

U.S. PATENT DOCUMENTS

| | | | |
|---|---|---|---|
| 6,684,192 B2 | 1/2004 | Honarvar et al. | |
| 6,708,155 B1 | 3/2004 | Honarvar et al. | |
| 6,892,546 B2 | 5/2005 | Singh et al. | |
| 6,928,471 B2* | 8/2005 | Pabari et al. | 709/223 |
| 6,963,826 B2 | 11/2005 | Hanaman et al. | |
| 7,024,870 B2 | 4/2006 | Singh et al. | |
| 7,027,958 B2 | 4/2006 | Singh et al. | |
| 7,062,757 B2 | 6/2006 | Honarvar et al. | |
| 7,076,475 B2 | 7/2006 | Honarvar | |
| 7,124,101 B1 | 10/2006 | Mikurak | |
| 7,130,807 B1 | 10/2006 | Mikurak | |
| 7,180,074 B1* | 2/2007 | Crosetto | 250/370.09 |
| 7,181,438 B1 | 2/2007 | Szabo | |
| 7,401,057 B2 | 7/2008 | Eder | |
| 7,409,303 B2 | 8/2008 | Yeo et al. | |
| 7,523,065 B2 | 4/2009 | Eder | |
| 7,526,434 B2 | 4/2009 | Sharp | |
| 7,539,655 B2* | 5/2009 | Pabari et al. | 706/28 |
| 7,565,336 B2* | 7/2009 | Pabari et al. | 706/28 |

OTHER PUBLICATIONS

Analysis of TCP-Reno and TCP-Vegas over AOMDV routing protocol for mobile ad hoc network, Othman, M.; Oo, M.Z.; Advanced Communication Technology (ICACT), 2010 The 12th International Conference on vol. 2 Publication Year: 2010 , pp. 1104-1108.*

Learning speech semantics with keyword classification trees, Kuhn, R.; De Mori, R.; Acoustics, Speech, and Signal Processing, 1993. ICASSP-93., 1993 IEEE International Conference on vol. 2 Digital Object Identifier: 10.1109/ICASSP.1993.319228 Publication Year: 1993 , pp. 55-58 vol.*

A preliminary study of factors affecting the performance of a Playback Attack Detector, Shang, W.; Stevenson, M.; Electrical and Computer Engineering, 2008. CCECE 2008. Canadian Conference on Digital Object Identifier: 10.1109/CCECE.2008.4564576 Publication Year: 2008 , pp. 000459-000464.*

Optimizing protocol parameters to large scale PC cluster and evaluation of its effectiveness with parallel data mining Oguchi, M.; Shintani, T.; Tmaura, T.; Kitsuregawa, M.; High Performance Distributed Computing, 1998. Proceedings. The Seventh International Symposium on Jul. 28-31, 1998 pp. 34-41 Digital Object Identifier 10.1109/HPDC.1998.7.

High Confidence Rule Mining for Microarray Analysis Mcintosh, T.; Chawla, S.; Computational Biology and Bioinformatics, IEEE/ACM Transactions on vol. 4, Issue 4, Oct.-Dec. 2007 pp. 611-623 Digital Object Identifier 10.1109/tcbb.2007.1050.

Exploring Time Series Retrieved from Cardiac Implantable Devices for Optimizing Patient Follow-Up Gueguin, M.; Roux, E.; Hernandez, A.I.; Porce, F.; Mabo, P.; Graindorge, L.; Carrault, G.; Biomedical Engineering, IEEE Transactions on vol. 55, Issue 10, Oct. 2008 pp. 2343-2352 Digital Object Identifier 10.1109/TBME.2008.926673.

Integrative data mining: the new direction in bioinformatics Bertone, P.; Gerstein, M.; Engineering in Medicine and Biology Magazine, IEEE vol. 20, Issue 4, Jul.-Aug. 2001 pp. 33-40 Digital Object Identifier 10.1109/51.940042.

The Application of RBF Neural Network on Construction Cost Forecasting Zhigang Ji; Yajing Li; Knowledge Discovery and Data Mining, 2009. WKDD 2009. Second International Workshop on Jan. 23-25, 2009 pp. 32-35 Digital Object Identifier 10.1109/WKDD.2009.53. Detecting patterns of appliances from total load data using a dynamic programming approach Baranski, M.; Voss, J.; Data Mining, 2004, ICDM '04. Fourth IEEE International Conference on Nov. 1-4, 2004 pp. 327-330 Digital Object.

Online Advertisement Campaign Optimization Liu, Weiguo; Zhong, Shi; Chaudhary, Mayank; Kapur, Shyam; Service Operations and Logistics, and Informatics, 2007. SOLI 2007. IEEE International Conference on Aug. 27-29, 2007 pp. 1-4 Digital Object Identifier 10.1109/SOLI.2007.4383887.

Mining Optimal Resource Combination in Computational Grid Pei-Jie Huang; Hong Peng; Qi-Lun Zheng; Machine Learning and Cybernetics, 2006 International Conference on Aug. 13-16, 2006 pp. 1159-1164 Digital Object Identifier 10.1109/1CMLC.2006.258597.

Detecting patterns of appliances from total load data using a dynamic programming approach, Baranski, M.; Voss, J.; Data Mining, 2004. ICDM '04. Fourth IEEE International Conference on Nov. 1-4, 2004 pp. 327-330, Digital Object Identified 10.1109/ICDM.2004.10003.

* cited by examiner

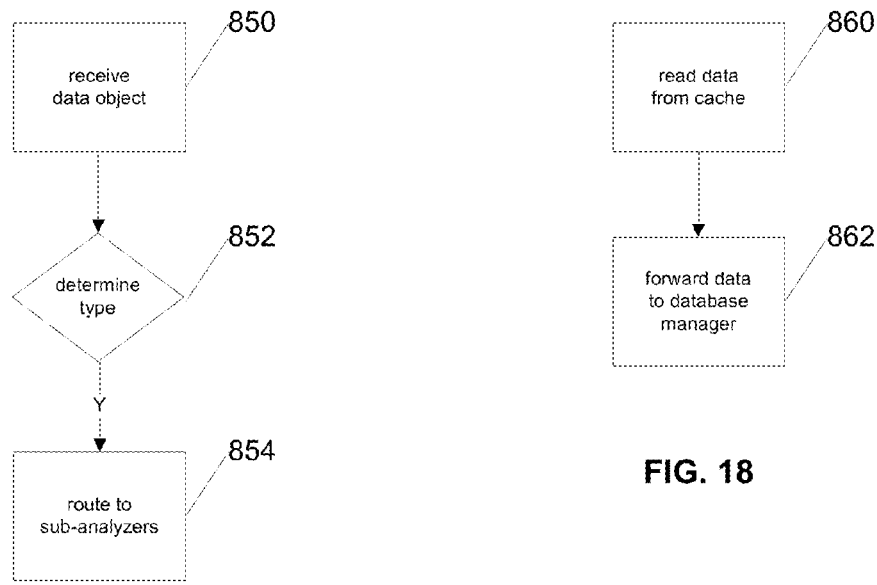
FIG. 17
FIG. 18
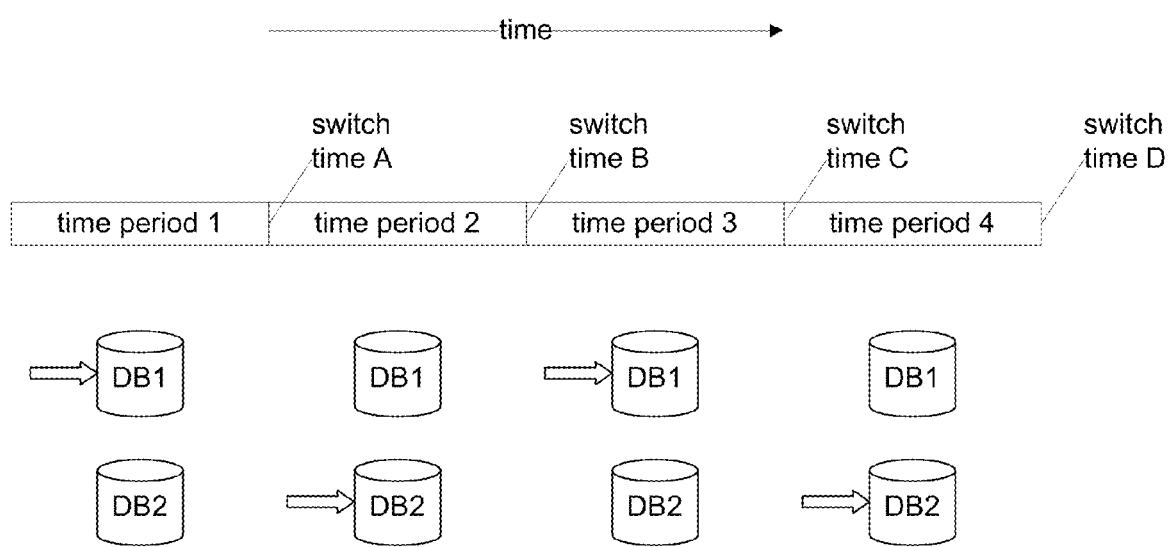
FIG. 19

METHOD AND APPARATUS FOR MEASUREMENT, ANALYSIS, AND OPTIMIZATION OF CONTENT DELIVERY

RELATED APPLICATION

The present application is a continuation of U.S. patent application Ser. No. 11/198,019 filed Aug. 4, 2005, which is a continuation of U.S. Pat. No. 6,928,471 filed on May 7, 2001, each of which is incorporated herein by reference in its entirety.

BACKGROUND

1. Field of the Invention

The present invention generally relates to apparatus and methods for improving the efficiency of an information server coupled with a communications network, and more specifically relates to the measurement, analysis, and optimization of content delivery over a communications network.

2. Related Art

In the competitive e-Business marketplace, a key success factor is the speed with which network based activities are conducted. Typically, potential customers, clients, and partners will go elsewhere if transactions or content are slow or unavailable. Studies show that many network based purchase transactions are abandoned because of frustration with slow response or unexpected web page behavior. For example, Jupiter Communications reported that 46% of consumers will leave a preferred web site if they experience any technical or performance problems. Therefore, e-Businesses must respond quickly to their customers' electronic requests, or risk serious financial injury.

Further evidence of the risk associated with slow transactions or content is the well known "eight second rule", which stipulates that electronic consumers will wait no longer than eight seconds before canceling a transaction or moving on to an e-Competitor. Unfortunately, most e-Business operators and service providers are not equipped with the necessary tools to ensure a positive experience for their potential customers, clients, and partners.

In response to this need, the Network and Systems Management ("NSM") market evolved to provide network monitoring and fault management capabilities. These key components were typically incorporated into complete frameworks and product suites that were created to enable the management of distributed systems. As management of network devices became commonplace, the industry focus shifted toward the improvement of the performance of client/server applications. The conventional frameworks did not address these pressing problems, and various discrete and single purpose niche products and solutions appeared to fill the need.

This eventually led to the emergence of the Infrastructure Performance Management ("IPM") market, which consists of products that help information technology operators manage the infrastructure of their network based applications, products, and services. Additionally, these products help customers to gauge the performance of the network and assist in troubleshooting when problems arise. The IPM market products typically address the main aspects of the e-Business infrastructure, such as the networks (LAN and WAN), network devices (switches, routers, firewalls, & bridges), servers, applications, databases. These products also address the main parameters of Service Level Management ("SLM"), which are availability, performance, accuracy, and security.

These two competing markets have collectively produced a variety of conventional web analysis tools that are fairly immature as vendors try to meet the market need of e-Business infrastructure management. First generation tools relied on log files to present graphical views of information relating to the operation of a web site. These conventional solutions can be classified as application level logging mechanisms that monitor web site traffic. A significant drawback of this conventional approach is that it does not provide any information relating to the actual delivery of content to the potential customer, client, or partner. This conventional approach did, however, provide adequate information to understand the demographics of the web site's user base.

Second generation tools used packet sniffing techniques to measure e-Business infrastructure traffic patterns at the internet protocol ("IP") layer. These types of conventional tools are typically focused on delivering solutions that help marketing professionals comprehend complex web traffic demographics and trends so they can more effectively provide banner ads to visiting potential customers.

Another approach used by second generation tools is to use specific test points external to the network infrastructure that periodically query the site under test. These periodic fixed queries from a limited number of test points are used to estimate site performance for the hypothetical customer who is assumed to be in the vicinity of the test point. Thus this solution does not capture the experience of an actual customer who visits the site. Furthermore, these conventional solutions only monitor specific, pre-defined pages of the target web site, allowing the particular problem page or pages to remain undetected.

An additional and very significant drawback of these solutions is that they can adversely impact the actual performance of the web site as more test locations are added in the attempt to improve accuracy. For example, a conventional system may "ping" the server computer to establish that the server is currently running and communicating. This requires the transmission of a data packet be sent to the targeted server computer, and the transmission of an acknowledgement data packet confirming receipt in response. Although this method confirms that the server computer is running and communicating, it requires the introduction of an intrusive data packet onto the network. Moreover, the acknowledgement data packet sent by the server computer to confirm receipt does not indicate whether any higher level applications are running on the server computer.

Other conventional methods may monitor log files that a server computer or an application may create. A drawback of this method is that considerable disk space and overhead may be consumed to create and maintain the necessary log files. Another conventional method involves placing an agent on the server computer or on a client computer in order to capture and analyze data. A disadvantage of this conventional solution is that it increases the workload of the processor on the server or client computer and requires constant maintenance on the part of the customer.

These conventional approaches presently overload servers, rely on hypothetical user data, introduce congestion causing traffic on the network, and produce overhead on the client or server host processor. Accordingly, the shortcomings associated with the related art have created a need for a method and apparatus that overcomes these significant problems. The present invention addresses these problems by providing a solution that has not previously been proposed.

SUMMARY

An apparatus and method for measurement, analysis and optimization of content delivery over a communications network is presented. In one embodiment, the apparatus detects data packets en route over a communications network. The data packets are read by the apparatus and combined into application messages. The application messages are further combined into user centric events that describe certain metrics relating to content delivery over the communications network.

Advantageously, the sometimes generous amounts of data created by the process of generating events are periodically aggregated in order to decrease, efficiently manage, and control the growth of the ever increasing amount of data being collected and saved in a data storage area. Furthermore, the events are continuously analyzed to identify metrics and statistics that determine the efficiency of the content delivery and the adequacy of the end user experience. Certain thresholds can be established and alarms generated when efficiency or adequacy falls below the threshold. Additionally, detailed reports tracking the efficiency and adequacy can be generated. Furthermore, real-time notification and proactive prevention of problems or anticipated problems can be provided.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 17 is a flowchart illustrating an example process for routing a data object to a sub-analyzer according to an embodiment of the present invention;

FIG. 18 is a flowchart illustrating an example process for populating a data storage area with cache data according to an embodiment of the present invention; and FIG. 19 is a flow diagram illustrating an example process for switching data repositories during operation according to an embodiment of the present invention.

DETAILED DESCRIPTION

Certain embodiments disclosed herein provide methods and apparatus for measurement, analysis and optimization of content delivery over a communications network. For example, one apparatus disclosed herein detects data packets on a network. These packets are read by the apparatus and as they are combined into high level application messages, certain user centric events are generated and stored for later analysis germane to the efficiency of content delivery over the network. Additionally, the user centric events are further correlated into groups directly relating to the experience of the end user, allowing metrics describing the end user experience to be stored. These metrics can also be analyzed to identify bottlenecks or errors in the delivery of content over a network.

Additionally, the system can analyze the metrics and proactively provide notice of existing problems or take action to prevent potential problems.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
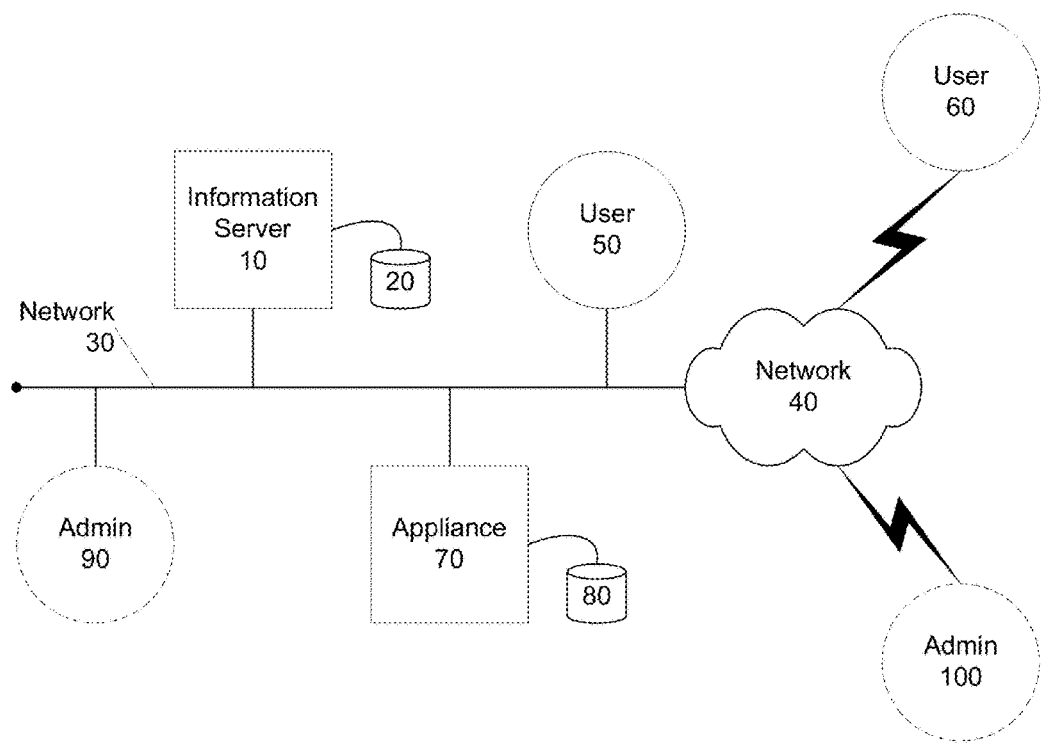
FIG. 1 is a block diagram illustrating a high level overview of an example system for measurement, analysis, and optimization of content delivery according to an embodiment of the present invention.

FIG. 1 is a block diagram illustrating a high level overview of an example system for measurement, analysis, and optimization of content delivery. The system has an information server 10 coupled with a data storage area 20. Information server 10 may incorporate various types of information servers including, for example, a world wide web ("WWW" or "web") server that provides web pages upon request. Additionally, information server 10 may incorporate a file server that provides files upon request through a file transfer program, a remote copy program, or some other utility. The various types of information servers may be integrated on a single general purpose computer or they reside on separate computers.

Additionally, information server 10 may comprise a plurality of general purpose computers that provides a single service. For example, a single web server may employ multiple computers to disperse the massive amounts of content available to users across multiple processor units and data storage areas. Alternatively, information server 10 may be a single general purpose computer that hosts a variety of discrete services. For example, a small web server, a file transfer server, or a real time data server.

In one embodiment, information server 10 may provide voice over IP ("VoIP") services. Alternatively, information server 10 may provide video on demand ("VonD") services. The multiple types of information, data, and the variety of services that can be provided by information server 10 are all contemplated within the scope of the present invention. However, for the purposes of this detailed description, information server 10 will be described in a web server embodiment in order to consistently and effectively describe the inner workings, features, and advantages of the present invention.

Content delivery embodies providing information or services to any client on demand. Content delivery may also include each of the various components in the content delivery chain from end users to an information server. For example, some components may include end users, programmed devices, intelligent devices, communication networks (including any intervening networks between the end user and the information server), servers, applications, and databases, just to name a few.

Preferably, information server 10 is connected to a communications network 30. In one embodiment, network 30 can be a local area network ("LAN") a wide area network ("WAN"), a public network, a private network, a virtual private network, a wired network, a wireless network, or various other types of communication networks. The function of network 30 is to carry content between information server 10 and other devices communicatively coupled with information server 10. Additional networks may also be employed to carry content. For example, content delivered from information server 10 to users 50 and 60 may travel over network 30 and network 40 to reach its destination. Additional networks may also be involved in the function of carrying content. Furthermore, users 50 and 60 may include actual persons using a general computing device and/or remote devices configured to query server 10.

Multiple appliances can be at each location where an appliance is shown. Multiple appliances can be used to provide redundancy or to allow an administrator to dedicate each appliance to measure, analyze, and optimize particular sets of information servers as a convenience.

Additionally connected to network 30 can be one or more appliances 70. Preferably, appliance 70 is situated on network 30 such that appliance 70 is capable of seeing all of the network traffic that is seen by information server 10. For example, appliance 70 may be located on the same physical wire as information server 10. Alternatively, appliance 70 may be located between network 30 and information server 10 such that all network traffic seen by information server 10 must pass through appliance 70. The function of the location of appliance 70 is to ensure that appliance 70 sees all of the network traffic available to information server 10.

Appliance 70 is preferably coupled with a data storage area 80. Data storage area 80 can be configured as a conventional database, a hierarchical file system, or many other viable alternatives for long term storage of information. In one embodiment, data storage area 80 can be configured as a lightweight directory access protocol ("LDAP") database. Data storage area 80 may be integrated within appliance 70 or alternatively, data storage area 80 may be external to appliance 70.

In one embodiment, admin 90 may be present on network 30 with information server 10 and appliance 70. Preferably, admin 90 has the ability to communicate with appliance 30 over network 30. Alternatively, admin 100 may be located on a remote network 40, although still communicatively coupled with appliance 70 via the combination of network 40 and network 30, including any intervening networks. The function of admin 90 is to communicate with appliance 70 and provide the ability to configure appliance 70 according to the desired performance of the system.

Figure 2:
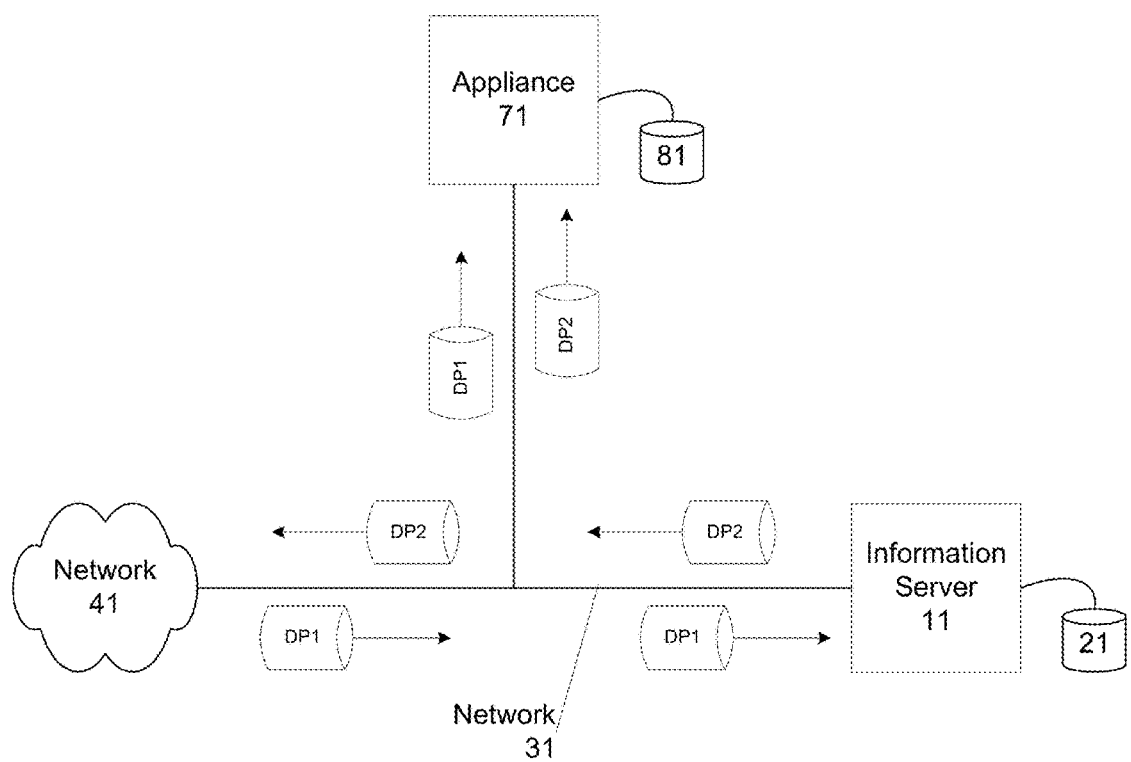
FIG. 2 is a flow diagram illustrating an example apparatus conFIG.d for measurement, analysis, and optimization of content delivery according to an embodiment of the present invention.

FIG. 2 is a flow diagram illustrating an example appliance 71 configured for measurement, analysis, and optimization of content delivery over one or more networks 31 and 41. As illustrated, data packets such as DP1 and DP2 travel over networks 31 and 41 from source network appliances (not shown) to information server 11 and back. Data packets DP1 and DP2 are representative of a significant number of data packets that, in aggregate, constitute the requests for and delivery of content by information server 11, which is preferably coupled with data storage area 21.

Appliance 71, coupled with data storage area 81, is positioned on network 76 relative to information server 11 such that appliance 71 sees all of the network traffic (i.e. data packets DP1 and DP2) destined for the targeted information server 11. As the data packets DP1 and DP2 travel past appliance 71, appliance 71 detects their presence and reads the data packets. The detection can be accomplished either actively or passively. Preferably, passive detection can be employed so as to reduce overall system overhead. As will be understood by those skilled in the arts, this function of appliance 71 may be implemented using a conventional packet capture device. A packet capture device may be implemented in hardware or software and performs the function of detecting and capturing data packets from a network as described above.

Figure 3:
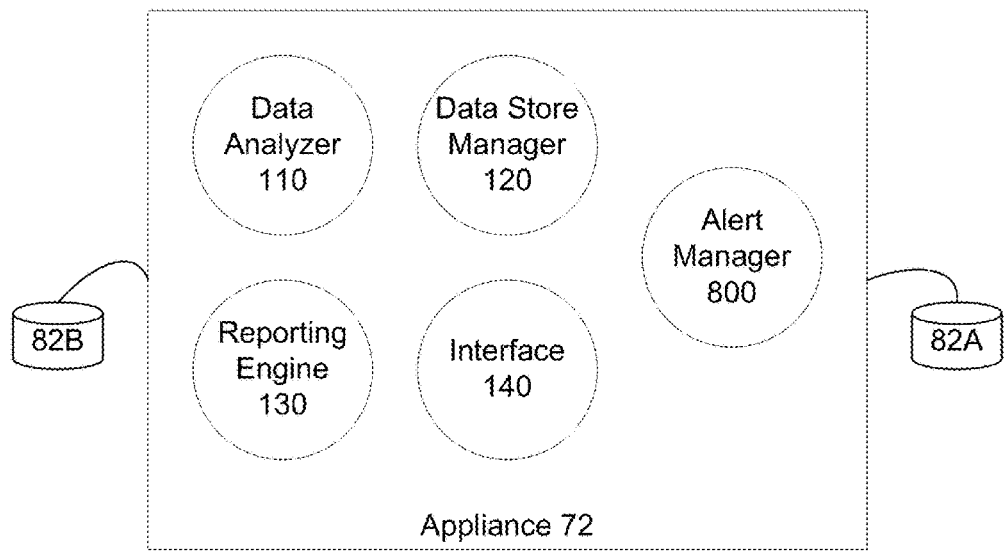
FIG. 3 is a block diagram illustrating an example apparatus for measurement, analysis, and optimization of content delivery according to an embodiment of the present invention.

FIG. 3 is a block diagram illustrating an example appliance 72 for measurement, analysis, and optimization of content delivery. Appliance 72 is preferably connected to a network (not shown) and coupled with a data storage areas 82A and 82B. The data storage areas 82A and 82B may be separate discrete storage areas or a single physical storage area logically separated into areas 82A and 82B. For example, data storage area 82A may be a disk drive that stores a standard LDAP database and data storage area 82B may be a cache that includes both memory storage area and disk storage area. In one embodiment, data storage areas 82A and 82B collectively include memory, hard drive, removable hard drive, magneto-optical storage discs, and other fixed and removable storage mediums that can be either volatile or persistent.

Appliance 72 may be comprised of a data analyzer 110, a data store manager 120, a reporting engine 130, an interface 140, and an alert manager 800. Data analyzer 110 detects the packets on the network (not shown), reads the packets, and combines and correlates the data packets into application messages and user-centric events. These user centric events are then multiplexed into various logical groupings and stored in data storage areas 82A and/or 82B. In one embodiment, the user centric events can be stored initially in data storage area 82B, which comprises memory and a cache, and then later transitioned into long term storage area 82A, which comprises an LDAP database.

Data store manager 120 controls the writing and reading of data to data storage areas 82A and 82B. Any data storage techniques employed by appliance 72 are implemented by data storage manager 120 in a fashion that simplifies the write and read operations of related components, such as data analyzer 110. For example, data store manager 120 may encrypt, compress, or otherwise massage the data maintained in data storage areas 82A and 82B for optimized and efficient storage. This encryption or compression is advantageously hidden from any components reading or writing data to data storage area 82A. In one embodiment, the data stored in long term storage area 82A can be compressed while the data stored in cache storage area 82B can be uncompressed.

Reporting engine 130 preferably accesses the data in data storage area 82A or 82B (through data store manager 120) and generates reports based on the raw data. Advantageously, reporting engine 130 may access the data in long term data storage area 82A in order to reduce overhead and allow cache storage area 82B to continue to be used by data collection processes.

Furthermore, reporting engine 130 may automatically generate reports and/or generate reports upon request. The format of the reports may be standard or customized. The essential function of reporting engine 130 is to read data from data storage areas 82A or 82B and recapitulate and format the data into a variety of reports that provide value and convey the nature of content delivery over a communications network.

Alert manager 800 preferably allows appliance 72 to modify the notification method used to inform a customer that a predefined or automatically defined threshold has been breached. For example, a threshold may be set in a configuration file. Alternatively, a threshold may be set by the continuous operation of an appliance such that the threshold is automatically configured by the appliance to be a certain percentage above the mean. Advantageously, this allows thresholds to be established for moving target type metrics such as page requests per hour.

For example, as page requests fluctuate, over time the appliance is able to calculate a mean number of page requests per hour, per minute, per day, or some other time related metric. In one embodiment, the mean page requests between 9:30 am and 9:45 am may be 1000. Thus, a threshold may be set so that the administrator is notified if the number of page requests exceeds the mean by 20%. In the situation where there are over 1200 page requests between 9:30 am and 9:45 am, alert manager 800 may advantageously provide a notice message to an administrator or other designated party.

Furthermore, alert manager 800 may allow the method for notifying the administrator to change. In one embodiment, the administrator may be notified by an entry written to a log file. Alternatively, the administrator may be notified via an email sent to the administrator's email address. Additionally, the administrator may be notified via a pager or some other convenient and real time electronic notification method.

Alert manager 800 may also provide the ability to respond to a threshold notice by taking steps to fix a detected problem. For example, alert manager 800 may reboot the information server if necessary. Also, the appliance may be configured to make modifications to an information server so as to ensure that no major disruptions in content delivery are experienced by users of the information server.

Figure 4:
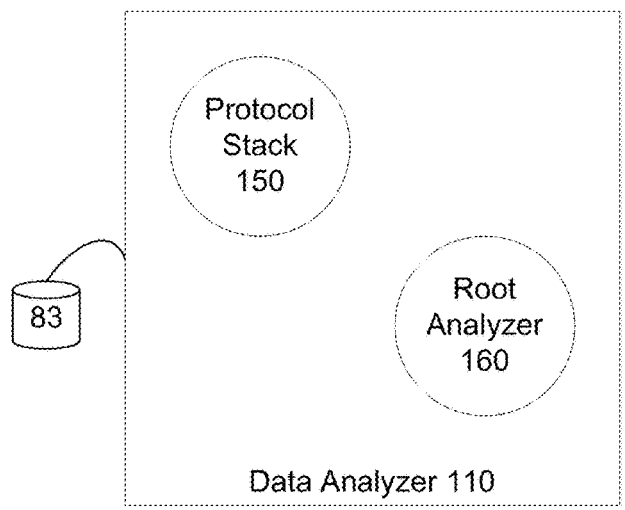
FIG. 4 is a block diagram illustrating an example data analyzer in an apparatus for measurement, analysis, and optimization of content delivery according to an embodiment of the present invention.

FIG. 4 is a block diagram illustrating an example data analyzer 110 in an apparatus for measurement, analysis, and optimization of content delivery. Data analyzer 110 can be connected to a data storage area 83. In one embodiment, data storage area 83 can be a cache storage system that is comprised of both memory and disk space. Data analyzer 110 is comprised of a protocol stack 150 and a root analyzer 160. The protocol stack 150 receives packets from a network and combines the packets into data objects that represent user centric events. Root analyzer 160 receives the data objects, sorts them into coherent groupings, and condenses the data elements contained within the data objects for optimized long term storage.

Figure 5:
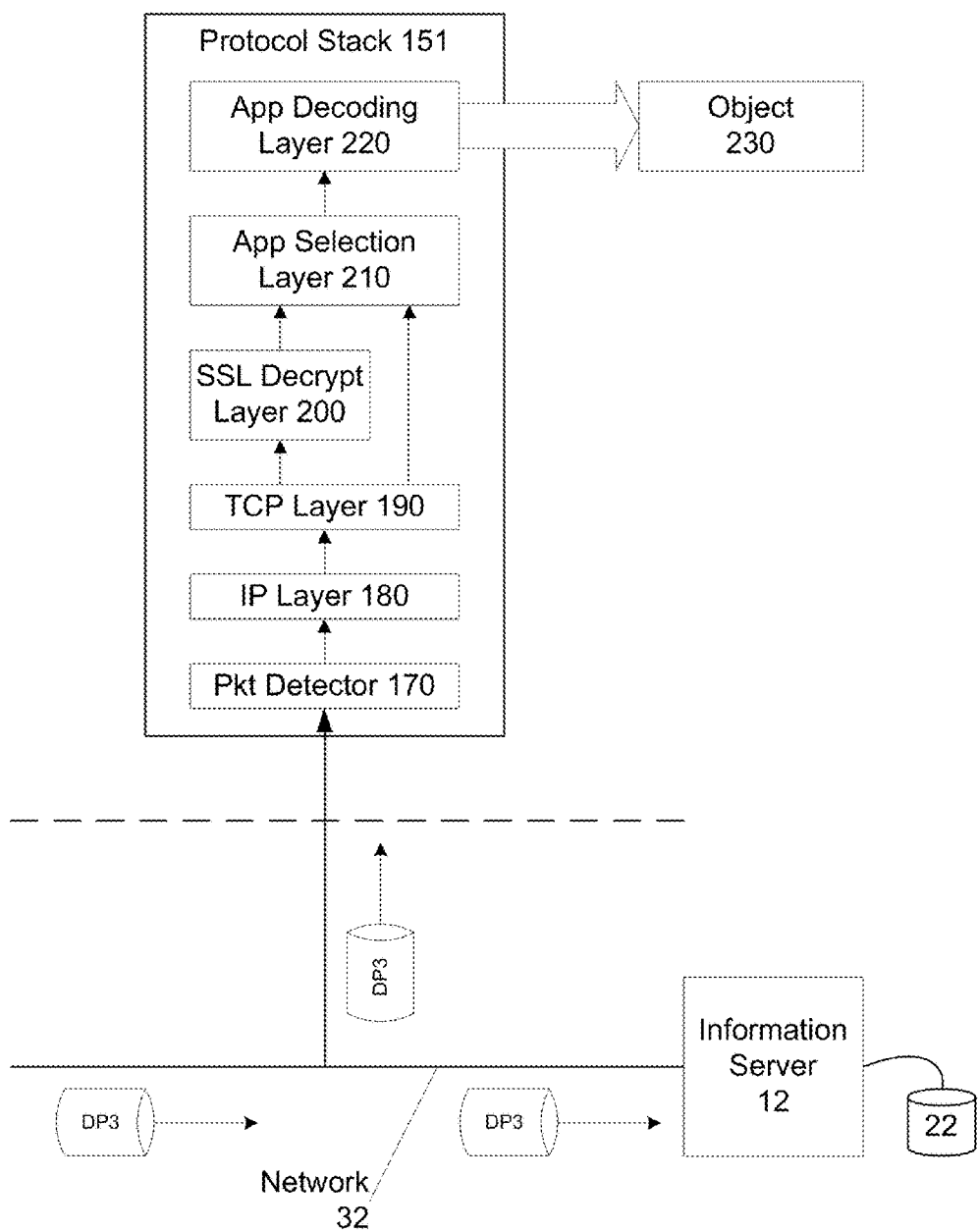
FIG. 5 is a flow diagram illustrating an example protocol stack in an apparatus for measurement, analysis, and optimization of content delivery according to an embodiment of the present invention.

FIG. 5 is a flow diagram illustrating an example protocol stack 151 in an apparatus for measurement, analysis, and optimization of content delivery. The protocol stack 151 resides in a data analyzer (not shown) that is connected to a network 32. Data packets, such as DP3, travel across the network to and from information server 12, which is coupled with a data storage area 22. These data packets are read and processed by protocol stack 151.

Protocol stack 151 can be comprised of a packet detector 170, an IP layer 180, a transport control protocol ("TCP") layer 190, a secure socket layer ("SSL") decrypter 200, an application selection layer 210, and an application decoding layer 220. Data packets such as DP3 are read into protocol stack 151 and combined by protocol stack 151 to ultimately produce a data object 230. The data object is preferably comprised of several data elements.

Packet detector 170 preferably captures each and every packet traveling on the network 32. Each packet that is captured by detector 170 is stored in a local buffer until it is moved into memory. As will be understood by those skilled in the art, commercial packet detectors carry out this function and can be integrated into the appliance to serve that limited purpose. An additional function of packet detector 170 is to apply a high resolution timestamp to each packet that is captured from network 32. Once a packet is captured and timestamped by packet detector 170, the packet is forwarded to IP layer 180.

IP layer 180 operates much like an IP layer of a conventional TCP/IP protocol stack, although on a much broader and more complex scale. IP layer 180 performs all of the standard operations of a conventional IP layer such as IP header validation, IP compliance, IP checksum validation, IP multiplexing, and IP data segment defragmentation. However, as a conventional IP layer performs these operations on packets destined for the machine on which the IP layer is running, IP layer 180 processes all packets detected on the network by detector 170, regardless of the destination.

In order to accomplish this, IP layer 180 creates a unique flow object to track the current state of each unique source-destination tuple (source IP, destination IP). Once the flow object has been created, the flow object processes each subsequent packet detected that contains the source IP and destination IP of the flow's unique tuple. In this fashion, IP layer 180 can advantageously process all packets detected on the network. Packets that are processed by IP layer 180 are then forwarded on to TCP layer 190.

TCP layer 190 operates much like a TCP layer of a conventional TCP/IP protocol stack, although on a much broader and more complex scale. TCP layer 190 performs all of the standard operations of a conventional TCP layer such as TCP header validation, TCP compliance, TCP checksum validation, TCP connection selection (multiplexing), TCP data segment ordering, and TCP data segment re-assembly. However, as a conventional TCP layer performs these operations on packets destined for the machine on which the TCP layer is running (either the client or the server), TCP layer 190 performs these operations for both the client and the server in every connection.

In order to accomplish this, TCP layer 190 maintains state information for both the client and the server in each unique client-server tuple (client IP, client port, server IP, server port). Additionally, the state changes detected by TCP layer 190 when processing datagrams received from IP layer 190 are passed along to the upper layers of the protocol stack 151. Furthermore, the time of the state change is also determined by TCP layer 190 and passed through to the upper layers of the protocol stack 151.

For example, some state changes that may be detected and passed through include TCP_SYN_SENT, TCP_SYN_RECV, TCP_ESTABLISHED, TCP_FIN_SENT, TCP_FIN_CONFIRMED, and TCP_CLOSE, just to name a few. Advantageously, TCP layer 190 captures the time that the state changes occur. This information can preferably improve the later analysis of content delivery. For example, the elapsed time between the TCP_SYN_RECV state and the TCP_ESTABLISHED state provides the round trip network delay between the client and server.

An additional advantage of TCP layer 190 is that it provides the upper layers of protocol stack 151 with application data from both the client and the server, along with additional protocol information. For example, in addition to providing the upper layers of protocol stack 151 with the application data, TCP layer 180 can additionally provide the length of the application data, the time when the application data was sent, and the time when the application data was acknowledged as received.

Additionally TCP layer 190 notifies the upper layers of protocol stack 151 when specific packets are transmitted. For example, TCP layer 190 passes through acknowledgement packets while conventional TCP layers do not. Datagrams that are processed by TCP layer 190 are then forwarded on to either SSL decrypt layer 200 or application layer 210. Those datagrams that are encoded using the secure socket layer encryption are sent by TCP layer 190 to the SSL decrypt layer 200. All other datagrams (including those that are not encoded and state change notifications) are passed along to application layer 210.

SSL decrypt layer 200 serves the function of decrypting encrypted traffic. This layer can be implemented by a conventional SSL decryption tool or utility and may use a standard SSL decryption algorithm.

The next several layers of protocol stack 151 use the wealth of information provided by the lowers layers of protocol stack 151 in conjunction with the application data provided by the lower layers. For example, TCP/IP state information and application data are correlated across multiple user sessions and connections to generate higher level descriptions of user, application, network, and server behavior.

It is important here to note that for each application (e.g. HTTP web browsers, FTP, email, VoIP, VonD, streaming media, etc.) that may deliver content over network 32, there is a unique set of application decoding layers. This is necessary because each application may use the underlying TCP/IP connections in different ways to carry out the communications between a client and a server.

For example, an HTTP web browser may open up several simultaneous TCP connections. Each connection is then used to download a different component of the current page. As these components arrive at the client, the web browser application begins to render the web page on the display. Often, some of these TCP connections are kept open by the web browser application in anticipation of downloading a new page shortly after the current page.

In contrast, the FTP (file transfer) application uses a single TCP connection for issuing commands and a second TCP connection for transmitting the requested file. After the transfer is complete, the TCP connection for transmission is closed.

This application specific disparity in handling state changes and data messages from the lower levels of protocol stack 151 may require a unique application decoding layer for each application. However, to generalize, each unique application decoding layer can have a similar structure consisting of a session processing layer, a connection processing layer, a message processing layer, and a content processing layer. Some application decoding layers may also have additional processing layers.

Application selection layer 210 allows protocol stack 151 to implement the various unique application decoding layers by identifying the appropriate application for the particular message received from TCP layer 190 or SSL decryption layer 200 and routing those messages to the corresponding application decoding layer 220. In one embodiment, the particular application decoding layer may be identified by the TCP server port for the connection. Advantageously, this information is passed to application selection layer 210 from TCP layer 190 or SSL decryption layer 200 and thus it is contained within the message.

As will be understood by those skilled in the arts, well known server ports are established for particular and common applications. For example, HTTP applications are typically associated with port 80; FTP applications are typically associated with port 20, telnet applications are typically associated with port 21, email applications (sendmail) are typically associated with port 23, and so on. In one embodiment, non-standard port numbers may be assigned to the various applications. In such an embodiment, the appliance may be configured to recognize the non-standard port numbers. Alternatively, the appliance may be configured to dynamically decipher the application associated with a particular port number. Once the application is identified by application selection layer 210, the particular message is forwarded to the appropriate application decoding layer 220. The output of application decoding layer is object 230, which preferably comprises various data elements.

The objects generated by the protocol stack describe various aspects of a user's interaction with an information server. For example, each application decoding layer may comprise a separate layer to process the various types of objects it may receive. In one embodiment, the application decoding layer may comprise a session layer, a connection layer, a message layer, a content layer, and a content component layer in order to efficiently process session objects, connection objects, message objects, content objects, and content component objects.

A session object may comprise user level events. In one embodiment, a session object can be created for each interaction between a user and an information server. Preferably, the session object may comprise data elements describing the user's overall experience with the application running on the information server(s).

A connection object may comprise transport level events. In one embodiment, one or more TCP connections can be opened with one or more information servers during the course of a session. For each of these connections, a connection object can be created. Preferably, the connection object comprises data elements that describe the overall performance and behavior of connections to an information server.

A message object may comprise requests and responses made to an information server. In one embodiment, one or more requests can be sent to an information server during the course of a session. For each of these requests, one or more responses can be sent back to the requesting client. Preferably, a request may contain a command or action to be performed by the information service, while a response may contain the result of performing the requested action.

In one embodiment, for each request that is made, a request message object can be created that comprises the type of request, the specific action, and the target of the action. Advantageously, additional details may be added to the object by other application decoding layers. Furthermore, for each response to a request, a response message object can be created that comprises the type of response, the success or failure of the request, and any resulting data that is to be returned to the requester. Again, additional details may be added by other application decoding layers.

A content object may comprise the high-level resources, data, information, or services provided by an information server. In one embodiment, each resource may have a unique name or identifier. For each resource accessed, a content object can be created that comprises the resource type, identity, size, availability, structure, and organization of the content. Advantageously, additional details may be added by the other application decoding layers.

A content component object may comprise a sub-part of the content provided by the information service. In one embodiment, an information server may break content up into various sub-components. For example, a web page provided by a web server may include dozens of images, many applets, and various other multi-media component. For each component accessed, a content component object can be created that comprises data elements describing the component type, identity, size, availability, structure, and organization. Additional details may be added to the content component object by the other application decoding layers.

Because the unique application decoding layers for the various applications are implemented in different fashions to accommodate an application's unique needs, the forthcoming description will proceed by describing application decoding layer 220 in reference to and in operation with an HTTP web browser application. It is, however, important to note that the present invention contemplates a protocol stack 151 with various application decoding layers corresponding to various applications and therefore the description herein with reference to HTTP is by way of example only and shall not be considered limiting in any manner.

Application decoding layer 220, specifically tailored for HTTP applications, may comprise four layers, namely the session processing layer, the connection processing layer, the message processing layer and the content processing layer. First, the session processing layer provides for tracking how each user is interacting with a monitored web site. The session processing layer correlates events from every connection to provide a high level view of how information server 12 is being used.

The session processing layer produces session objects as output. For example, object 230 could be a session object. Preferably, a unique session object is created for each unique client IP address that is received. Advantageously, all events and messages contain the client IP address so they can be correctly identified. Furthermore, each subsequent event and message that contains the same client IP address is forwarded to the appropriate session object. A session object preferably contains data elements that describe the various aspects of a user's session with information server 12. When complete, a session object is forwarded to the root analyzer for further processing and storage.

In one embodiment, a session object may include data elements reflecting the number of user clicks, the number of pages downloaded, average download time, download time per page, cumulative download time, session length (how long the user was on the site), average network delay between client and server, client access speed (slowest link in connectivity), number of application messages sent/received by user, size of application messages sent/received by user, type and number of application requests made by user, number and size of data packets sent/received by user, and number and size of TCP segments sent/received by user.

The connection processing layer produces connection objects as output. For example, object 230 could be a connection object. Preferably, a connection object contains various data elements that describe the various aspects of a single connection between a single user (not shown) and information server 12. A connection object can be uniquely identified by the tuple (client IP, client Port, server IP, server Port). Advantageously, this information is propagated up protocol stack 151 by the lower layers. Preferably, there is a one-to-one correlation between connection objects and TCP connections identified at TCP layer 190. When complete, a connection object is forwarded to the root analyzer for further processing and storage.

In one embodiment, a connection object may include data elements reflecting the number of open connections, the number of request messages, server response time, number of successful requests, number of failed requests, network delay from the server to the end user, connection terminated by the end user or server, number of TCP segments exchanged between client and server, number of packets exchanged between end user machine and the server.

The message processing layer produces message objects as output. In one embodiment, types of message objects may include request message objects and response message objects. For example, object 230 could be a request message object or a response message object. The function of the message processing layer is to extract application specific data elements from each message.

The message processing layer advantageously determines whether the message is a request from the client to the server or whether the message is a response from the server to the client. In an HTTP application, the server sends a response message for every request message.

For processing HTTP request messages, the message processing layer may determine the command type (e.g., GET, PUT, POST, HEAD, etc.), the uniform resource locator ("URL"), the referrer, and the host (server). This data can preferably be stored in the request message object.

For processing HTTP response messages, the message processing layer may determine the response code (success, server error, client error, redirect, informational), the content type (text, binary), the content encoding (compressed, uncompressed, uu-encoded, etc.), and the last time modified, to name just a few.

For both the HTTP request and HTTP response, many other application specific data elements may be extracted. The details about each message can be stored in a request or response message object. When complete, a request or response message object is forwarded to the root analyzer for further processing and storage.

In one embodiment, a message object may include data elements reflecting the number and size of packets sent/received by the user, the number and size of TCP segments sent/received by the user, the number of packets required to transmit a message, number of segments required to transmit a message, request type (GET, PUT, POST, HEAD), request URL, Referrer, response type (Success, Client Error, Server Error, etc.), content type, content encoding, and the like.

The content processing layer produces content and content component objects as output. For example, object 230 could be a content object or a content component object. The function of the content processing layer is to use information from all other layers (session, connection, message, and the lower networking layers) to extract high-level representations of the data, information, services, and other resources provided by an information server. The type and structure of the content is different for every application.

For example, HTTP content provided by a web information server can be represented as a page object. The content can be also be sub-divided into page components. When complete, a page object or page component object is forwarded to the root analyzer for further processing and storage.

In one embodiment, a content object may include data elements reflecting the URL of a page, number of page downloads, number of page components in a page, number of pages successfully downloaded, number of pages unsuccessfully downloaded, time to download a complete page, size of the entire page, number of packets to download a complete page, number of segments to download a complete page, number of connections opened to download a page, and the number of pages stopped for download by the end user.

In one embodiment, a content component object may include data elements reflecting the Page component object reflecting the Uniform Resource Locator (URL) of a page, number of page component downloads, number of components successfully downloaded, number of components unsuccessfully downloaded, time to download a page component, size of the page component, number of packets to download a page component, and the number of segments to download a page component.

FIGS. 6A-E are flow diagrams illustrating example root analyzers 161-164 in an apparatus for measurement, analysis, and optimization of content delivery. The function of the root analyzer is to discern the type of object received from the protocol stack and then route that object to one or more appropriate sub-analyzers. In one embodiment, root analyzer 161 has various sub-analyzers including session analyzer 280, server analyzer 290, application analyzer 300, page analyzer 310, page component analyzer 320, and web site analyzer 330. Additional sub-analyzers may be added to handle different types of specialized objects. These analyzers preferably handle the various types of data objects, such as object 231, that are passed to root analyzer 161.

The function of the various sub-analyzers can advantageously be to analyze one or more objects created by the protocol stack and create or update the appropriate storage area that may be later viewed by an end-user of the appliance. Preferably, the various sub-analyzers can use identifying field values in the object to correctly select the particular storage area to update. In one embodiment, a storage area may comprise a plurality of external objects.

External objects can be those objects in a longterm storage area (e.g., a database). Preferably, the longterm storage area is accessible to users of the appliance via an interface. In one embodiment, external objects can map directly to elements in the service delivery chain for an information server. Examples of external objects include server objects, application objects, user session objects, network objects, web-site objects, and web page objects. In one embodiment, an external server object can be created for each information server providing a service. Additional objects specific to an information server's delivery chain may also be included.

For example, an external web page object can be specific to the web information server. External objects can be created by the various sub-analyzers. Sub-analyzers use objects received from the protocol stack to construct external objects. For example, an external object can be an aggregation of all the internal objects used in its creation.

Figure 6A:
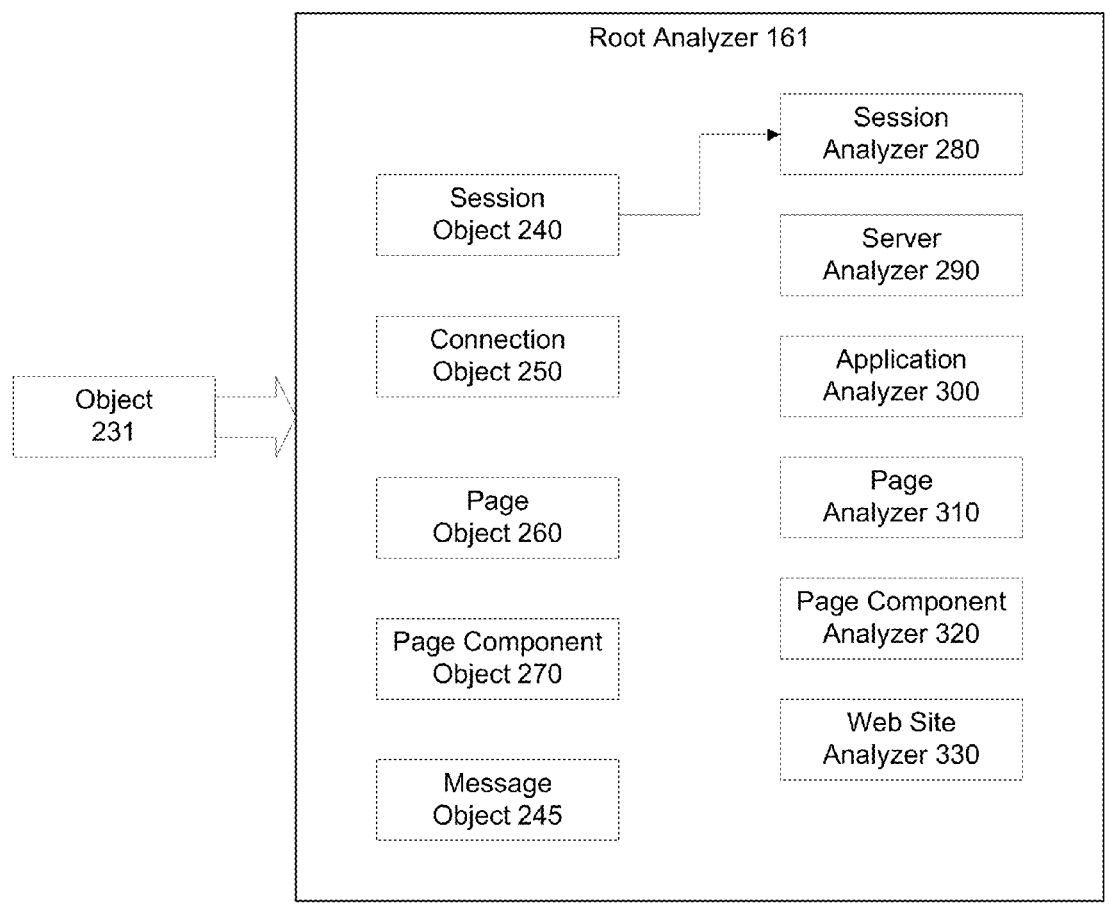
FIGS. 6A-E are flow diagrams illustrating an example root analyzer in an apparatus for measurement, analysis, and optimization of content delivery according to an embodiment of the present invention.

For example, FIG. 6A illustrates a session object being sent to root analyzer 161. Upon receiving object 231 and determining that the object is a session object 240, root analyzer 161 passes session object 240 to session analyzer 280 for further processing and storage. The other sub-analyzers (server, application, page, page component, and web site) do not receive session objects.

Figure 6B:
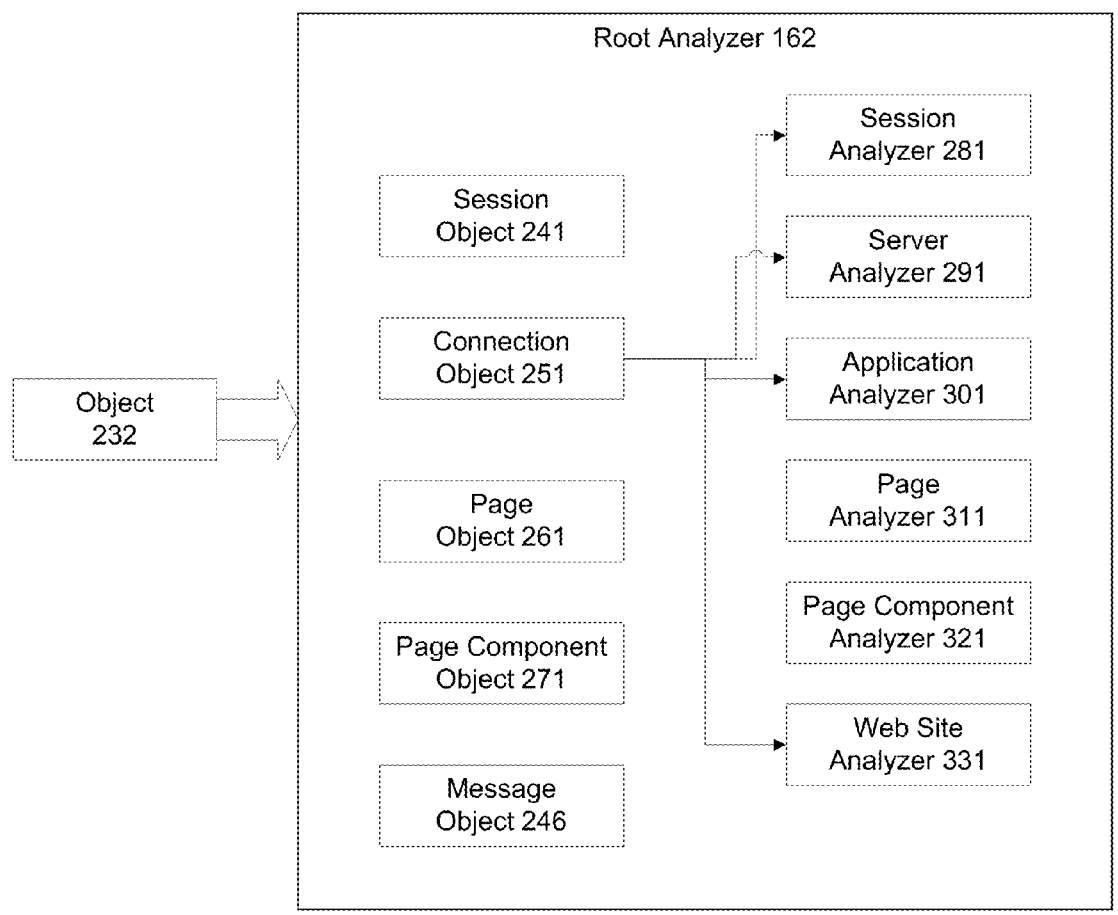

In FIG. 6B, root analyzer 162 receives object 232 and determines that it is a connection object 251. Upon determining the type of object, root analyzer 162 passes connection object 251 to session analyzer 281, server analyzer 291, application analyzer 301, and web site analyzer 331. Advantageously, connection object 251 may contain data elements germane to each of the sub-analyzers that it is passed to. Page analyzer 311 and page component analyzer 321 do not receive connection objects.

Figure 6C:
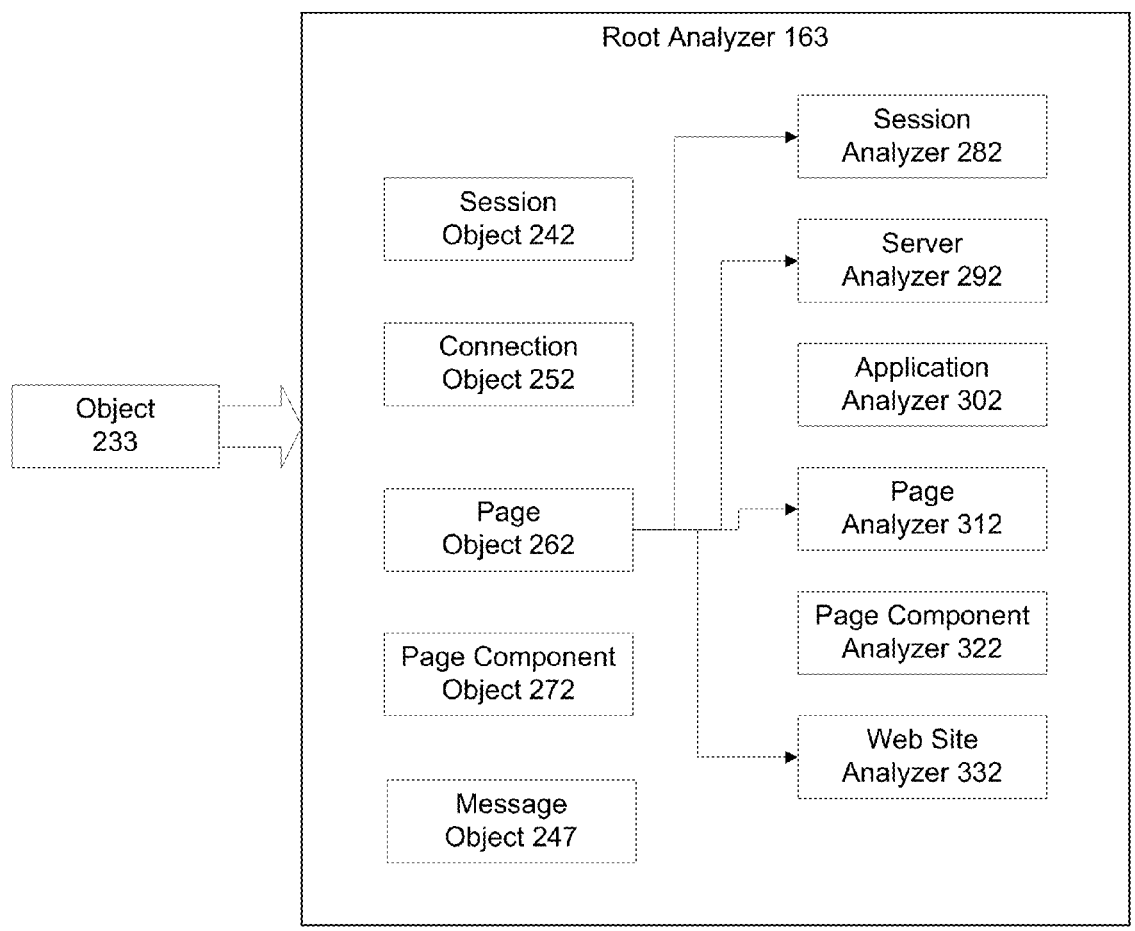

In FIG. 6C, root analyzer 163 receives object 233 and determines that it is a page object 262. Upon determining the type of object, root analyzer 163 passes page object 262 to session analyzer 282, server analyzer 292, page analyzer 312, and web site analyzer 332. Advantageously, page object 262 may contain data elements germane to each of the sub-analyzers that it is passed to. Application analyzer 302 and page component analyzer 322 do not receive page objects.

Figure 6D:
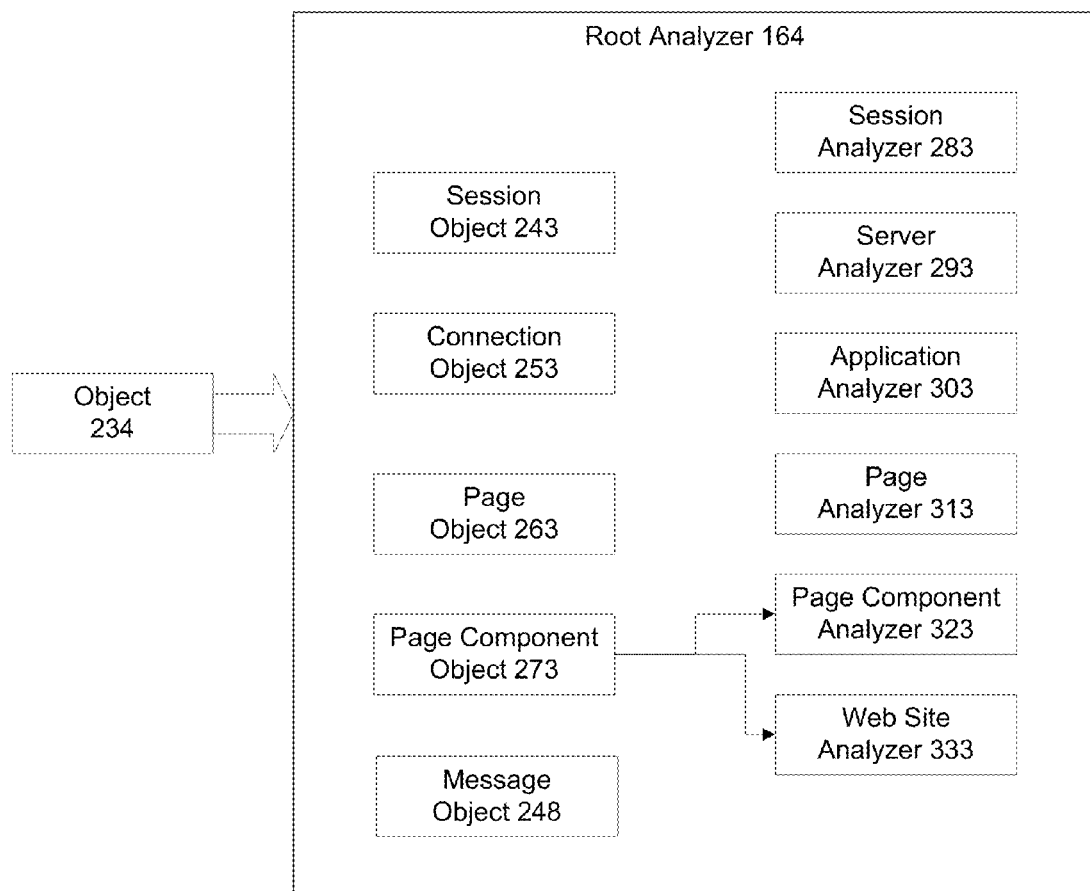

In FIG. 6D, root analyzer 164 receives object 234 and determines that it is a page component object 273. Upon determining the type of object, root analyzer 164 passes page component object 273 to page component analyzer 323 and web site analyzer 333. Advantageously, page component object 273 may contain data elements germane to each of the sub-analyzers that it is passed to. Session analyzer 283, server analyzer 293, application analyzer 303, and page analyzer 313 do not receive page component objects.

Figure 6E:
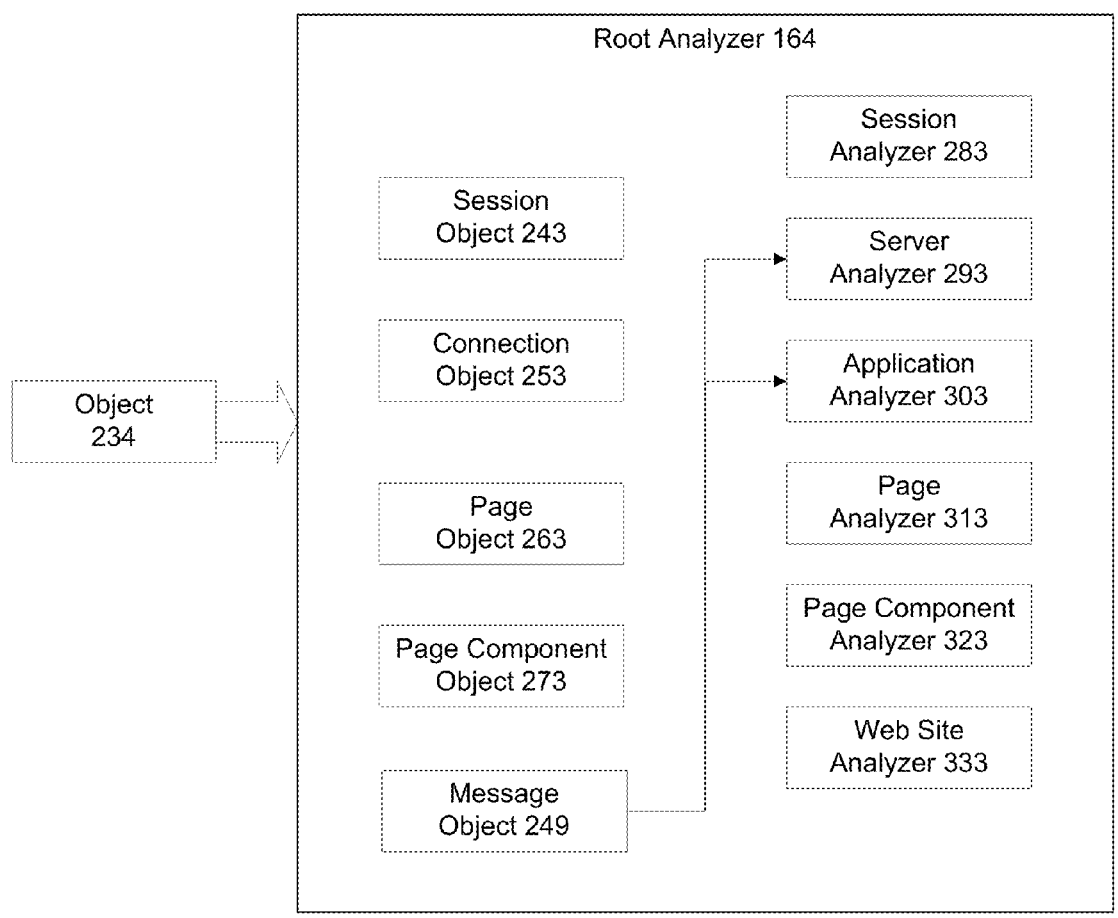

In FIG. 6E, root analyzer 164 receives object 234 and determines that it is a message object 249. Upon determining the type of object, root analyzer 164 passes message object 249 to server analyzer 293 and application analyzer 303. Advantageously, message object 273 may contain data elements germane to each of the sub-analyzers that it is passed to. Session analyzer 283, page analyzer 313, page component analyzer 323, and web site analyzer 333 do not receive message objects.

Figure 7A:
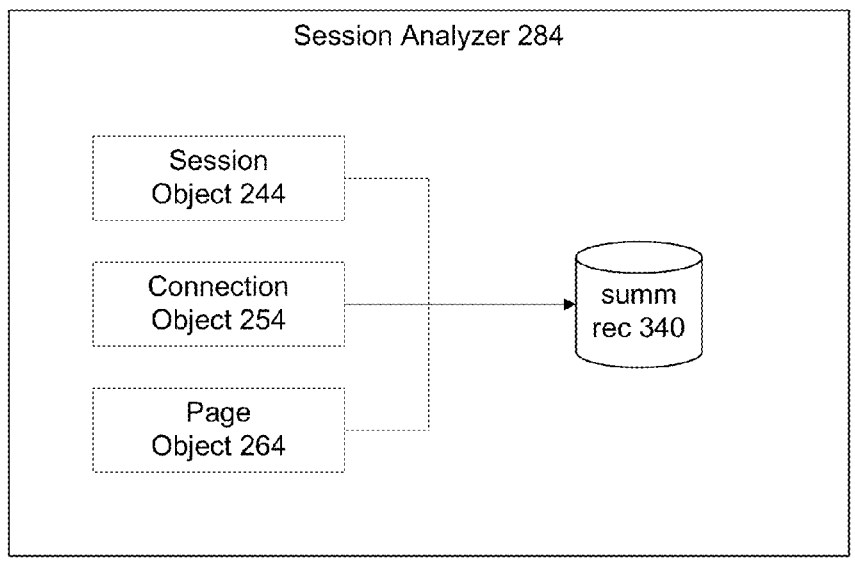
FIG. 7A is a flow diagram illustrating an example session analyzer in an apparatus for measurement, analysis, and optimization of content delivery according to an embodiment of the present invention.

Once a sub-analyzer receives a data object, the sub-analyzer parses the data object to determine its characteristics and then stores the elements of the data object in the appropriate data record. For example, FIG. 7A illustrates a session analyzer 284, which may receive data objects of type session object 244, connection object 254, or page object 264. Because there can be an infinite number of user sessions with an HTTP information server, session analyzer 284 stores the data elements from all of the data objects it receives in a single summary record 340, rather than creating a new record for each unique session. Advantageously, this helps to manage the growth of data and also provides a unique, cumulative user session profile that characterizes the average user session with the information server.

Figure 7B:
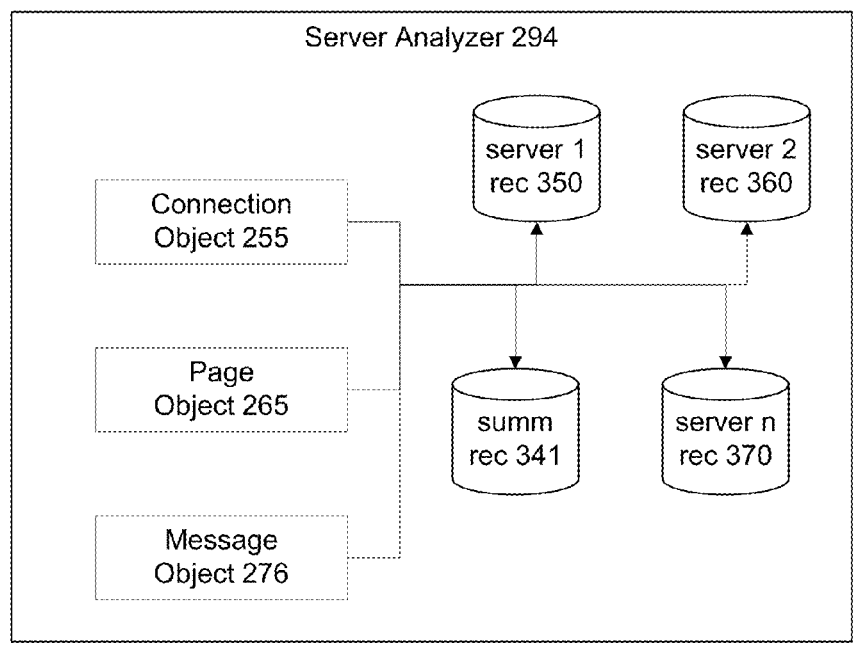
FIG. 7B is a flow diagram illustrating an example server analyzer in an apparatus for measurement, analysis, and optimization of content delivery according to an embodiment of the present invention.

FIG. 7B illustrates a server analyzer 294, which may receive data objects of type connection object 255, page object 265, and message object 276. Because a single apparatus may monitor one or more servers (or one or more applications on one or more servers) there can be a server record for each information server being tracked. For example, server analyzer 294 may have a server 1 record 350, a server 2 record 360, and a server n record 370. The presence of server n record 370 indicates that there may be additional server records. Furthermore, server analyzer 294 may maintain a summary record 341.

When server analyzer 294 receives a data object such as connection object 255, page object 265, or message object 276, it can parse the object to determine which server the object is associated with. Advantageously, this information is contained in the object as constructed by the protocol stack. For example, server analyzer 294 may determine the server by the IP address data element contained in the data object. Upon determining the appropriate record for the object, server analyzer 294 can store the relevant data elements from the data object in the identified record. In addition, server analyzer 294 can store data elements from the data object in the summary record 341.

Figure 7C:
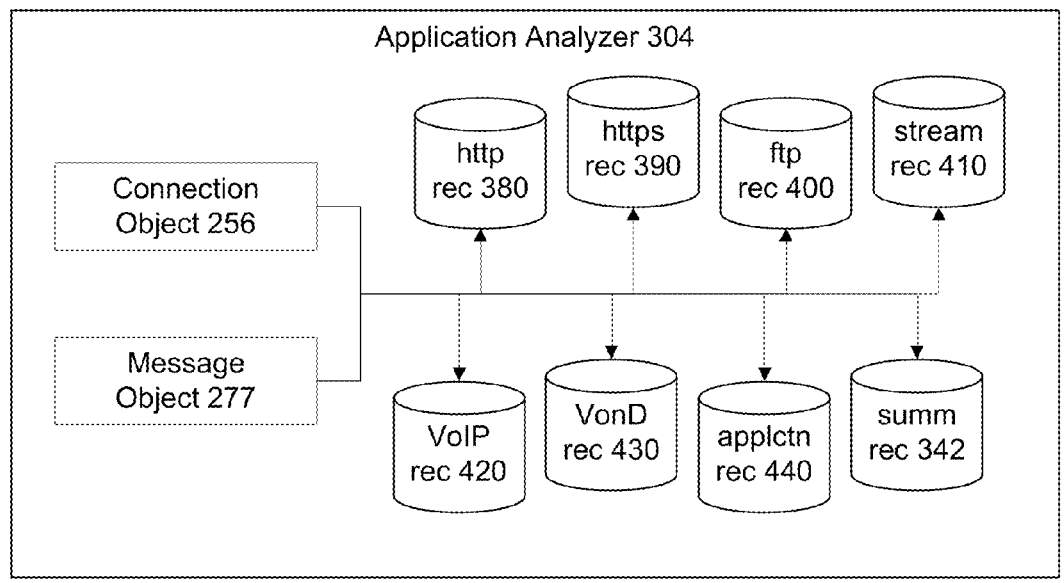
FIG. 7C is a flow diagram illustrating an example application analyzer in an apparatus for measurement, analysis, and optimization of content delivery according to an embodiment of the present invention.

FIG. 7C illustrates an application analyzer 304, which may receive data objects of type connection object 256 and message object 277. Because a single apparatus may monitor one or more applications there can be an application record for each application being tracked. For example, application analyzer 304 may have an HTTP record 380, an HTTPS record 390, an FTP record 400, a streaming media record 410, a VoIP record 420, a VonD record 430, and a record for any of the various other applications that may be monitored by application analyzer 304, as illustrated by the presence of application record 440. In addition, application analyzer 304 may maintain a summary record 342.

When application analyzer 304 receives a data object such as connection object 256 or message object 277, it preferably parses the object to determine which application the object is associated with. Advantageously, this information is contained in the object as constructed by the protocol stack. For example, application analyzer 304 may determine the associated application by the well known TCP Port data element contained in the data object. Upon determining the appropriate record for the object, application analyzer 304 preferably stores the relevant data elements from the data object in the identified record. In addition, application analyzer 304 can store data elements from the data object in the summary record 342.

Figure 7D:
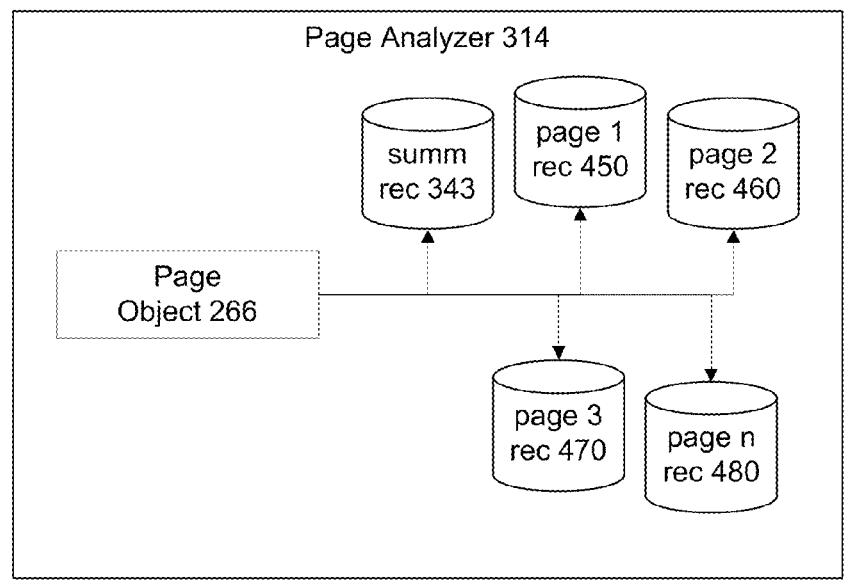
FIG. 7D is a flow diagram illustrating an example page analyzer in an apparatus for measurement, analysis, and optimization of content delivery according to an embodiment of the present invention.

FIG. 7D illustrates a page analyzer 314, which may receive data objects of type page object 266. Because a single information server may host a large number of web pages, there can be a page record for each page being hosted by the information server. For example, page analyzer 314 may have a page 1 record 450, a page 2 record 460, a page 3 record 470, and a record for any of the various other pages that may be hosted by an information server and monitored by page analyzer 314, as illustrated by the presence of page n record 480. In addition, page analyzer 314 may maintain a summary record 343.

When page analyzer 314 receives a data object such as page object 266, it preferably parses the object to determine which page the object is associated with. Advantageously, this information is contained in the object as constructed by the protocol stack. For example, page analyzer 314 may determine the associated page by the URL data element contained in the data object. Upon determining the appropriate record for the object, page analyzer 314 preferably stores the relevant data elements from the data object in the identified record. In addition, page analyzer 314 can store data elements from the data object in the summary record 343.

Figure 7E:
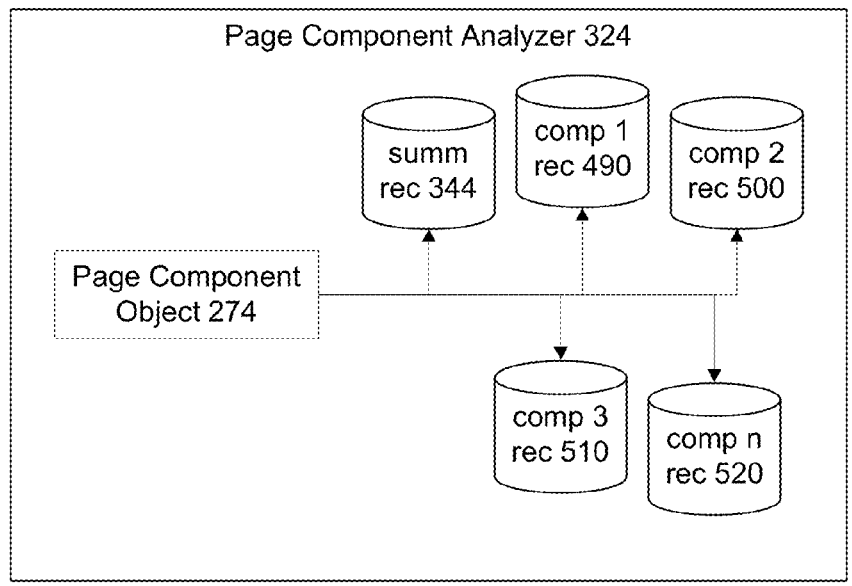
FIG. 7E is a flow diagram illustrating an example page component analyzer in an apparatus for measurement, analysis, and optimization of content delivery according to an embodiment of the present invention.

FIG. 7E illustrates a page component analyzer 324, which may receive data objects of type page component object 274. Because a single information server may host a large number of web pages, and each web page may have a large number of page components, there can be a page component record for each page component existing on a web page being hosted by the information server. For example, page component analyzer 324 may have a component 1 record 490, a component 2 record 500, a component 3 record 510, and a record for any of the various other components that may be monitored by page component analyzer 324, as illustrated by the presence of component n record 520. In addition, page component analyzer 324 may maintain a summary record 344.

When page component analyzer 324 receives a data object such as page component object 274, it preferably parses the object to determine which component the object is associated with. Advantageously, this information is contained in the object as constructed by the protocol stack. For example, page component analyzer 324 may determine the associated component by the URL data element contained in the data object. Upon determining the appropriate record for the object, page component analyzer 324 preferably stores the relevant data elements from the data object in the identified record. In addition, page component analyzer 324 can store data elements from the data object in the summary record 344.

Figure 7F:
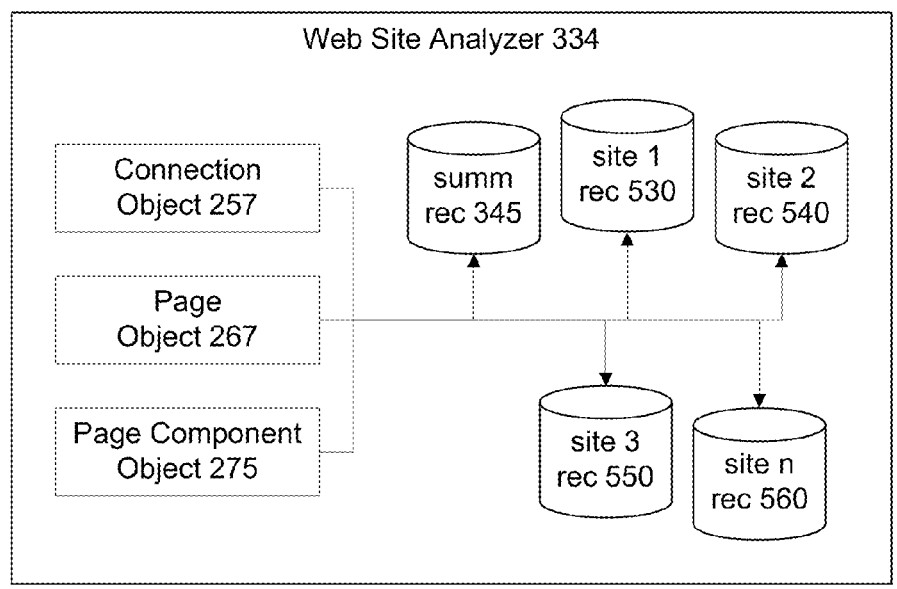
FIG. 7F is a flow diagram illustrating an example web site analyzer in an apparatus for measurement, analysis, and optimization of content delivery according to an embodiment of the present invention.

FIG. 7F illustrates a web site analyzer 334, which may receive data objects of type connection object 257, page object 267, and page component object 275. Because a single apparatus may monitor a large number of web sites, there can be a web site record for each web site being monitored by the information server. For example, web site analyzer 334 may have a site 1 record 530, a site 2 record 540, a site 3 record 550, and a record for any of the various other web sites that may be monitored by web site analyzer 334, as illustrated by the presence of site n record 560. In addition, web site analyzer 334 may maintain a summary record 345.

When web site analyzer 334 receives a data object such as connection object 257, page object 267, or page component object 275, it preferably parses the object to determine which component the object is associated with. Advantageously, this information is contained in the object as constructed by the protocol stack. For example, web site analyzer 334 may determine the web site by the URL data element contained in the data object, or a combination of the IP address data element and the TCP Port data element. Upon determining the appropriate record for the object, web site analyzer 334 preferably stores the relevant data elements from the data object in the identified record. In addition, web site analyzer 334 can store data elements from the data object in the summary record 345.

As described above with reference to FIGS. 7A-7F, the various sub-analyzers store data elements in various records. These records preferably exist in a cache data storage area available to the data analyzer. As the records begin to accumulate, the data analyzer preferably employs data migration to manage the growth of the data while maintaining the detail rich information being collected.

Figure 8:
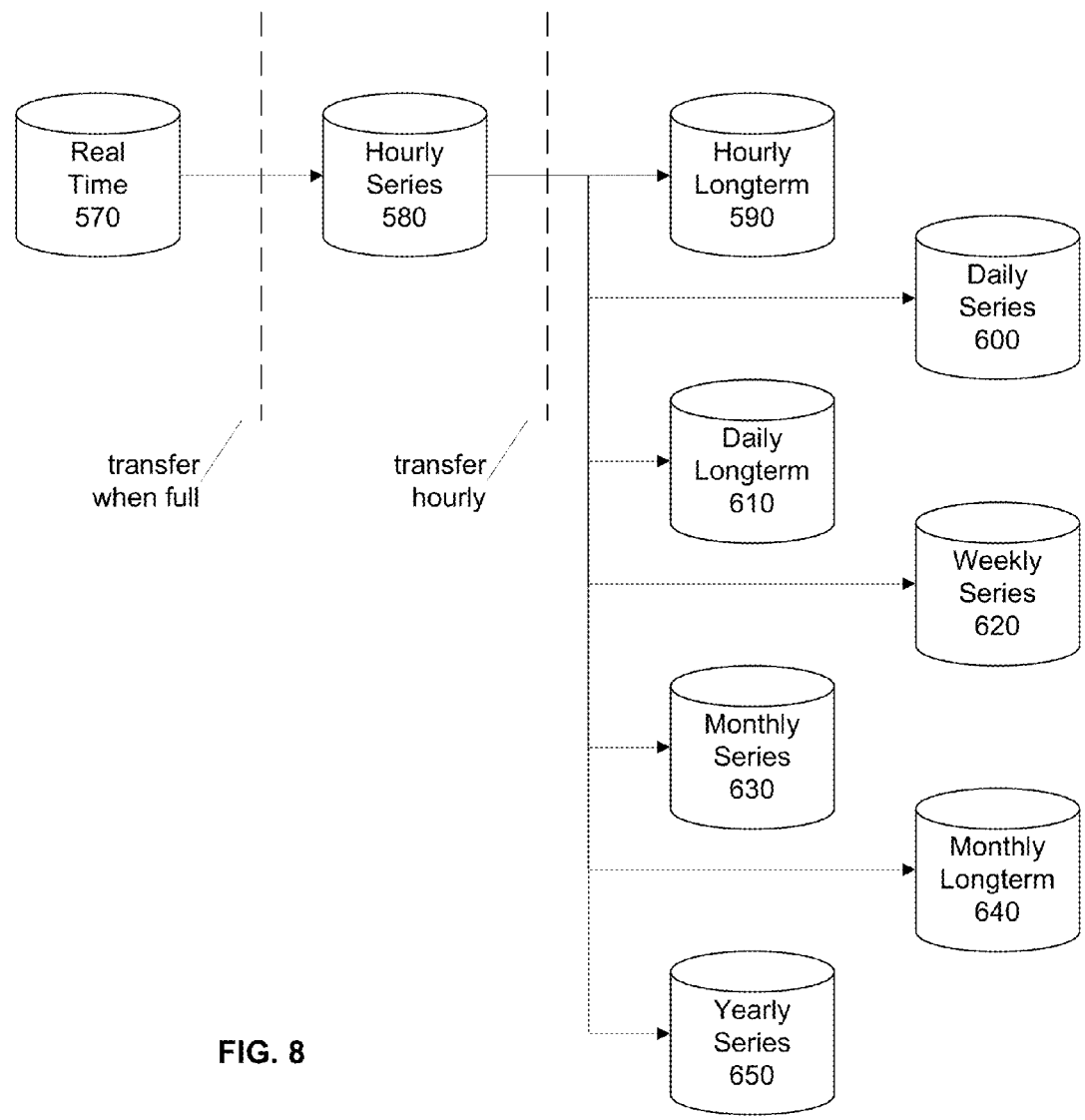
FIG. 8 is a flow diagram illustrating an example data migration in an apparatus for measurement, analysis, and optimization of content delivery according to an embodiment of the present invention.

FIG. 8 is a flow diagram illustrating an example data migration in an apparatus for the measurement, analysis, and optimization of content delivery. Initially, all of the data is stored in the real time database 570. When the real time database 570 becomes full, the data is aggregated into the hourly series database 580. Advantageously, aggregating the data maintains the level of detail represented by the data while at the same time significantly reducing the necessary storage space required to maintain that detailed information.

As the hourly series database 580 accumulates data, the data stored therein is periodically aggregated into various additional databases including the hourly longterm database 590, the daily series database 600, the daily longterm database 610, the weekly series database 620, the monthly series database 630, the monthly longterm database 640, and the yearly series database 650. The periodic nature of the aggregation from the hourly series database 580 to the various other databases can be hourly, as suggested, or some other period more closely tailored to the efficient operation of the system. Since aggregations may take processor time and cause disk accesses, it may be advantageous to increase or decrease the period.

Figure 9:
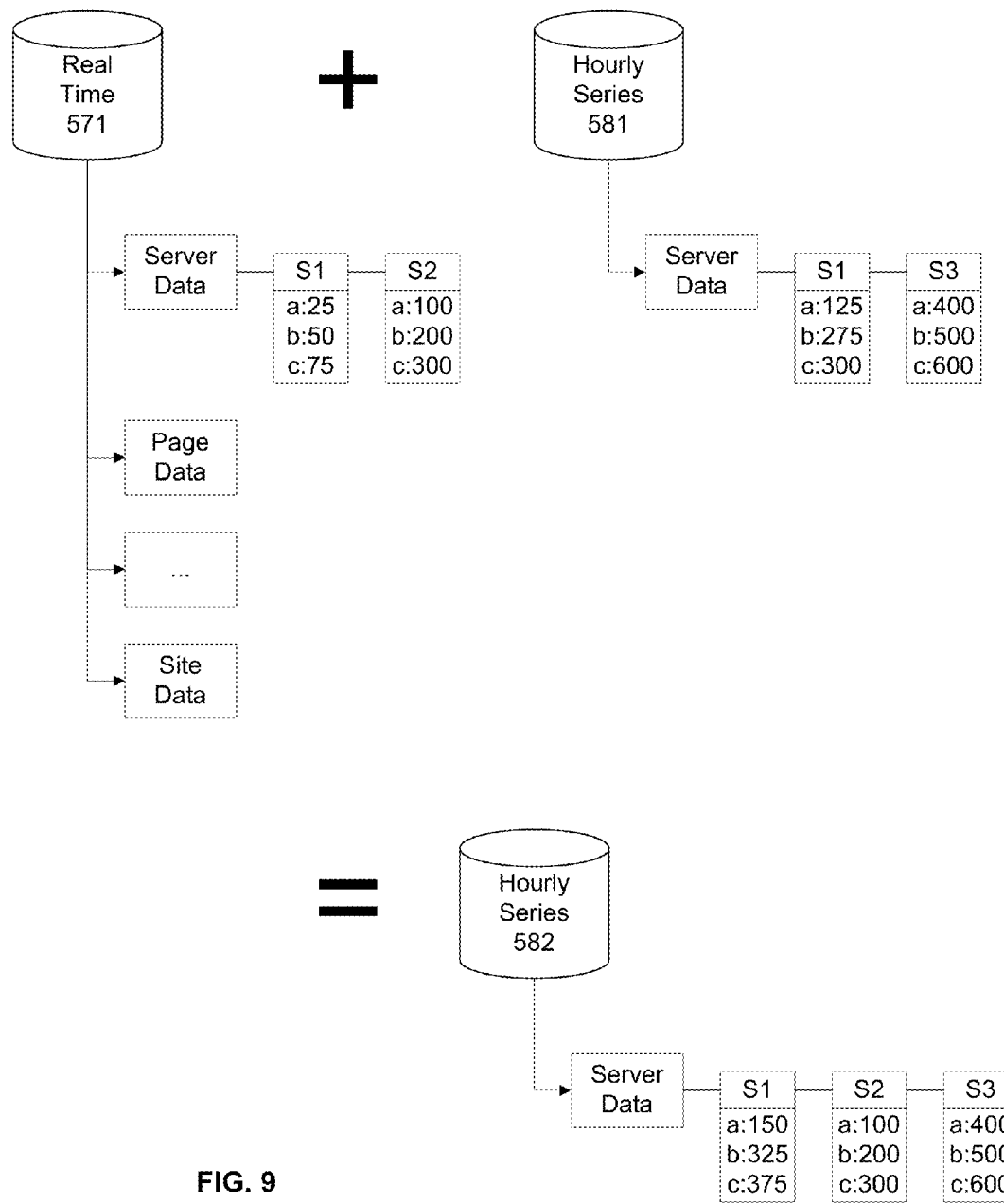
FIG. 9 is a flow diagram illustrating an example data aggregation in an apparatus for measurement, analysis, and optimization of content delivery according to an embodiment of the present invention.

FIG. 9 is a flow diagram illustrating an example data aggregation in an apparatus for measurement, analysis, and optimization of content delivery. As described above, the advantage of aggregating data is twofold: first, the space required to house the data is reduced; and second, the rich detail of the data is maintained. For example, as the real time database 571 accumulates data elements in its records, the storage area allocated to real time database 571 begins to wane. During the accumulation time period, real time database 571 may store server data in records S1 and S2. This represents the data that has been accumulated during the current period for real time database 571. This data requires a certain amount of storage area to hold data elements S1:a, S1:b, S1:c, S2:a, S2:b, and S2:c.

When the data is aggregated into hourly series database 581, the data elements can advantageously be summed with like data elements already contained in hourly series database 581. For example, hourly series database 581 contains server data and already includes a data record S1. Therefore, data elements S1:a, S1:b, and S1:c already exist in hourly series database 581. However, hourly series database 581 does not contain a data record S2, and it does contain a data record S3.

Upon completion of the aggregation, hourly series database 582 (the updated version of hourly series database 581) contains data records S1, S2, and S3. Although the hourly series database 582 contains a new data record, the size of hourly series database 582 was increased by only a single data record (S2) while two data records S1 and S2 were aggregated into hourly series database 582. Note that the new values in data record S1 have increased to reflect the data added from real time database 571. This maintains the detail rich data collected by the apparatus while reducing the overall size of the data needed to be maintained.

Figure 10:
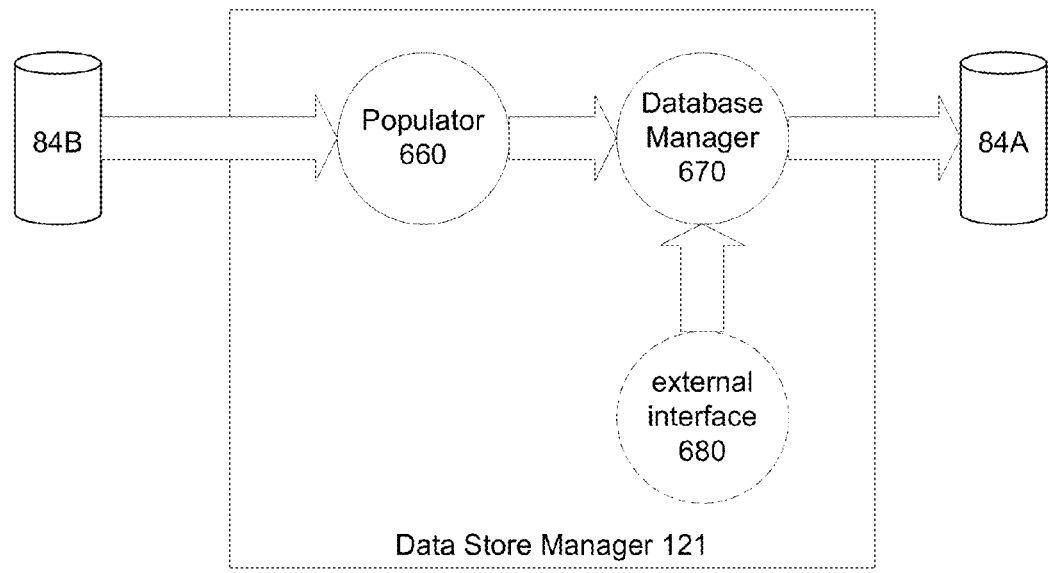
FIG. 10 is a block diagram illustrating an example data store manager of an apparatus for measurement, analysis, and optimization of content delivery according to an embodiment of the present invention.

FIG. 10 is a block diagram illustrating an example data store manager 121 of an apparatus for measurement, analysis, and optimization of content delivery. The data store manager 121 may be comprised of a populator 660, a database manager 670, and an external interface 680. Additionally, data store manager 121 has access to data storage areas 84A and 84B. In one embodiment, data storage areas 84A and 84B may be a single data storage area as previously described with reference to FIG. 3. Preferably, data storage area 84A is used for long term storage while data storage area 84B is used for near term storage. For example, data storage area 84B may be a cache comprising both memory and disk space. Alternatively, the cache may comprise only memory or only disk space.

The function of the data store manager is to migrate data from near term storage in the cache to long term storage. Accordingly, data storage area 84A may comprise a standard database system such as an LDAP database. Preferably, populator 660 periodically reads data from cache 84B and passes the data to database manager 670. Advantageously, database manager 670 receives the data from populator 660 and writes the data to longterm storage in data storage area 84A.

In order to manage the exponential growth of data being written to data storage area 84A, database manager 670 employs a purging method to limit the growth. For example, the long term data storage area 84A preferably contains the same type of information that is maintained in cache 84B. However, as the data in cache 84B is aggregated by the data analyzer, the rich detail of the data being collected is propagated into the various databases contained in the data storage area, as described with reference to FIGS. 8 and 9. Therefore, database manager 670 preferably periodically purges the potentially huge amounts of data stored in the real time database in data storage area 84A.

For example, as the data analyzer aggregates data from the real time database to the hourly series database and later to the various other databases, the need to maintain the data in the real time database eventually passes. In one embodiment, data from the real time database is aggregated into the hourly series database every 5 minutes. Correspondingly, data from the hourly series database is aggregated into the hourly longterm database every hour. As the hourly longterm data is read from the cache 84B and passed to the database manager 670 and written in the long term data storage area 84A, the data in the real time database in long term data storage area 84A becomes obsolete. Therefore, the database manager may purge this obsolete data and thereby manage the controlled growth of the data in long term data storage area 84A. The method by which this is accomplished will be subsequently described with reference to FIG. 19.

Figure 11:
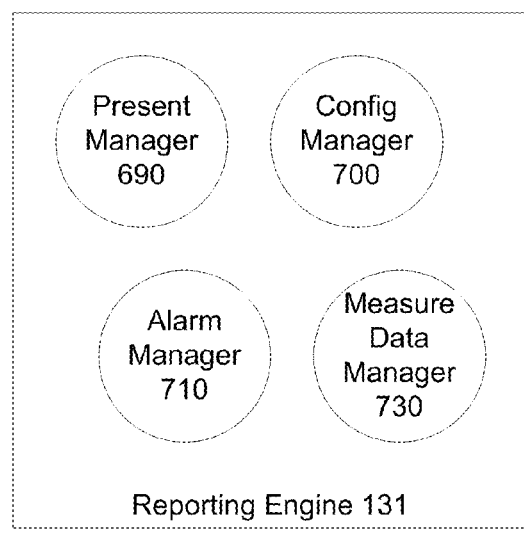
FIG. 11 is a block diagram illustrating an example reporting engine of an apparatus for measurement, analysis, and optimization of content delivery according to an embodiment of the present invention.
Figure 12A:
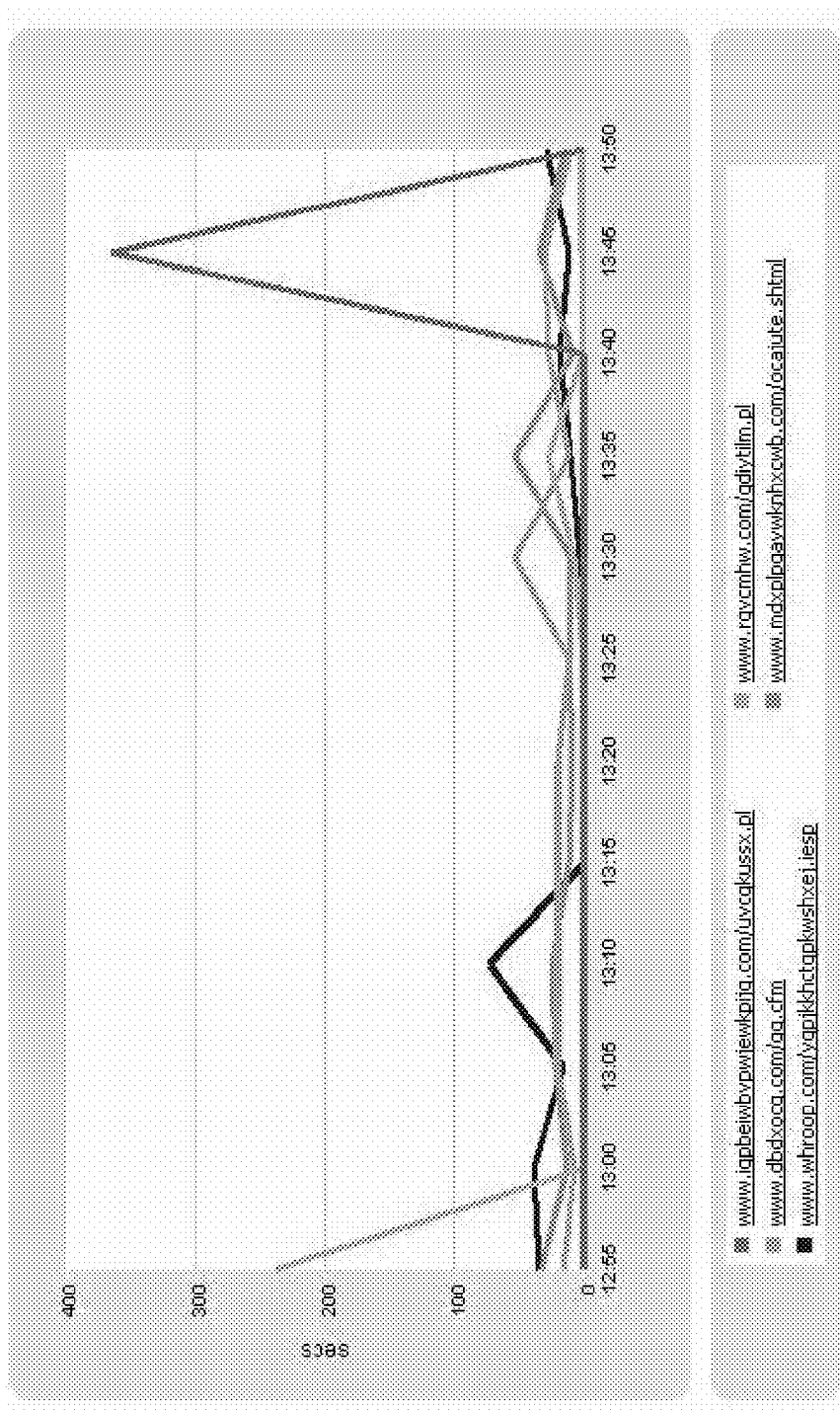
FIGS. 12A-E are software application windows illustrating example interfaces for presenting reports and information in a system for measurement, analysis, and optimization of content delivery according to one embodiment of the present invention.
Figure 12B:
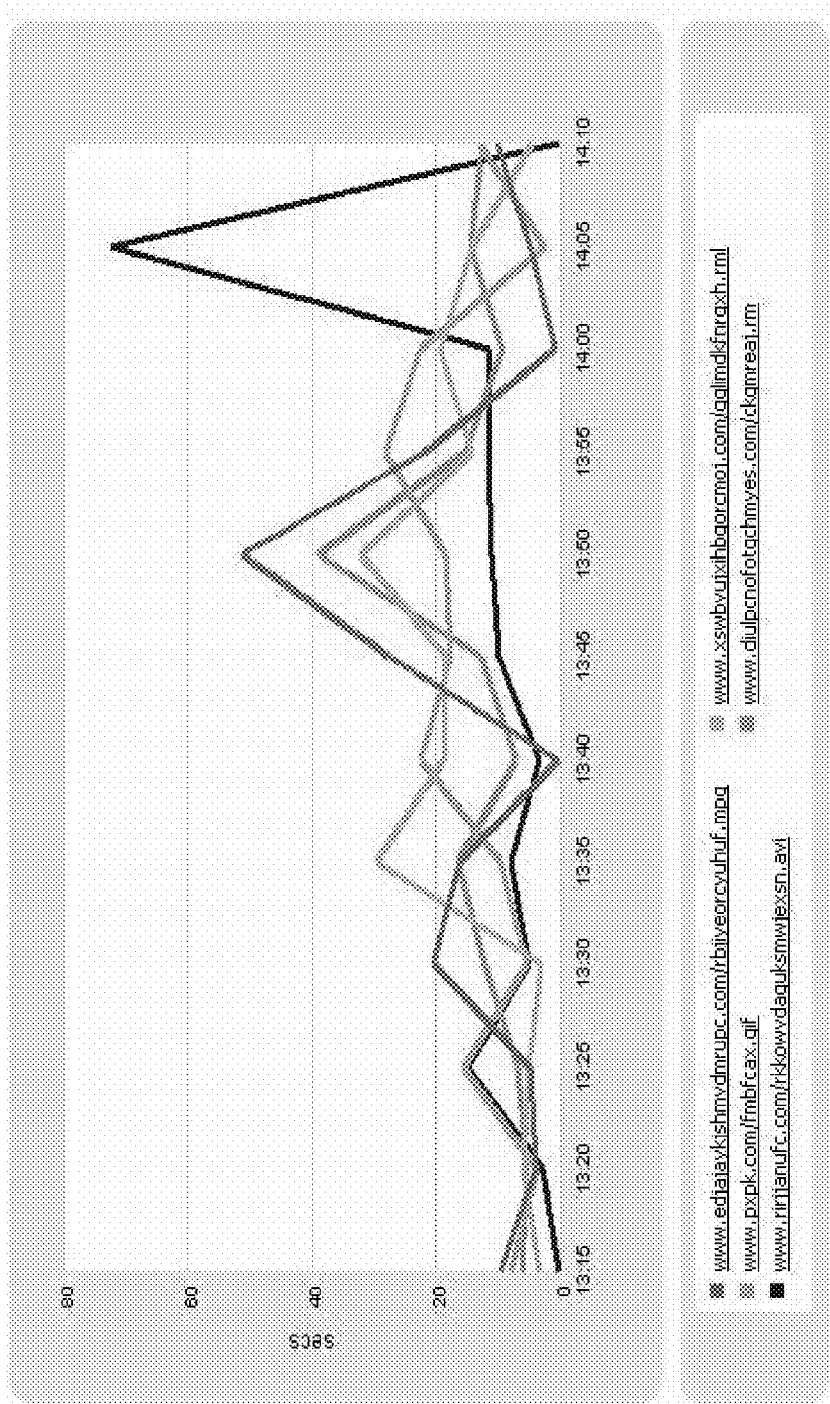
Figure 12C:
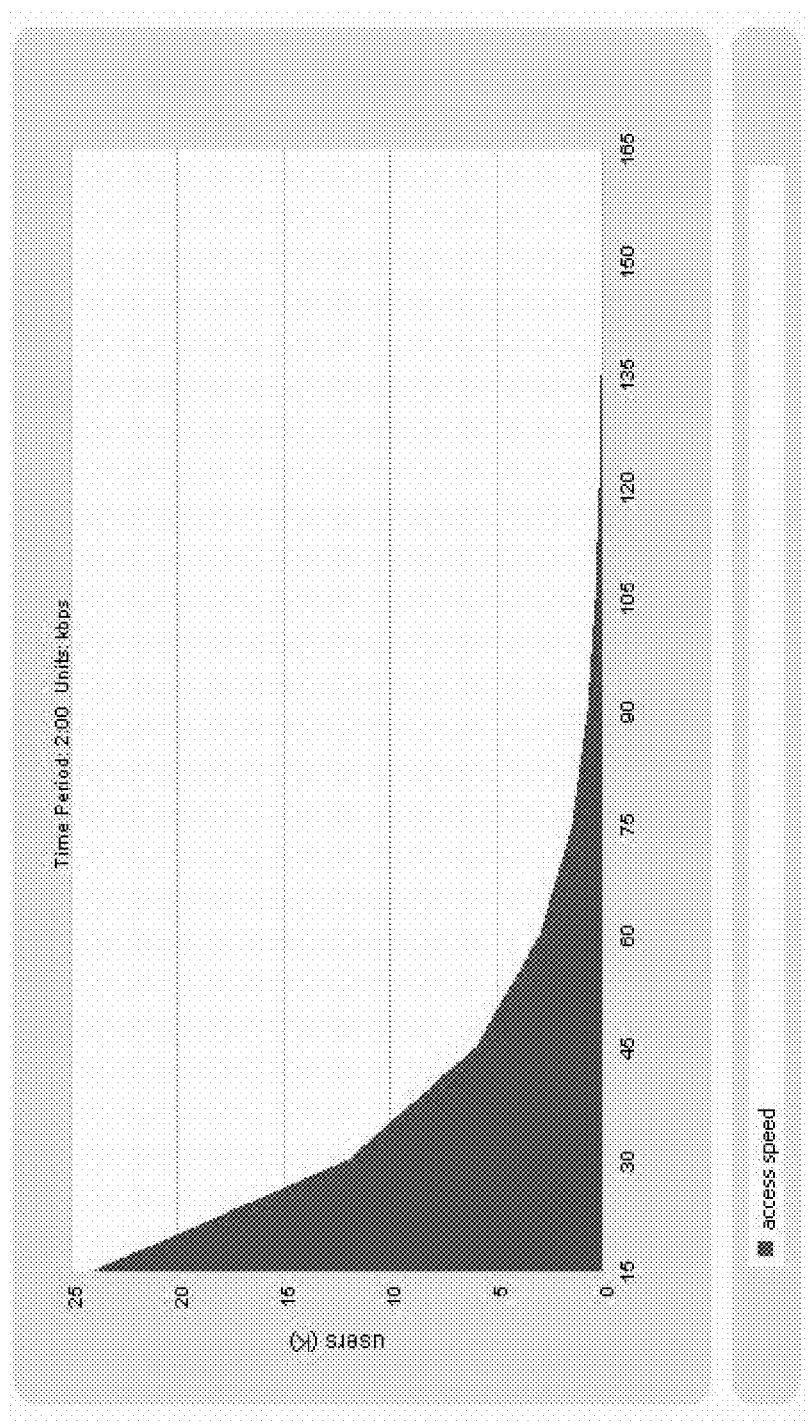
Figure 12D:
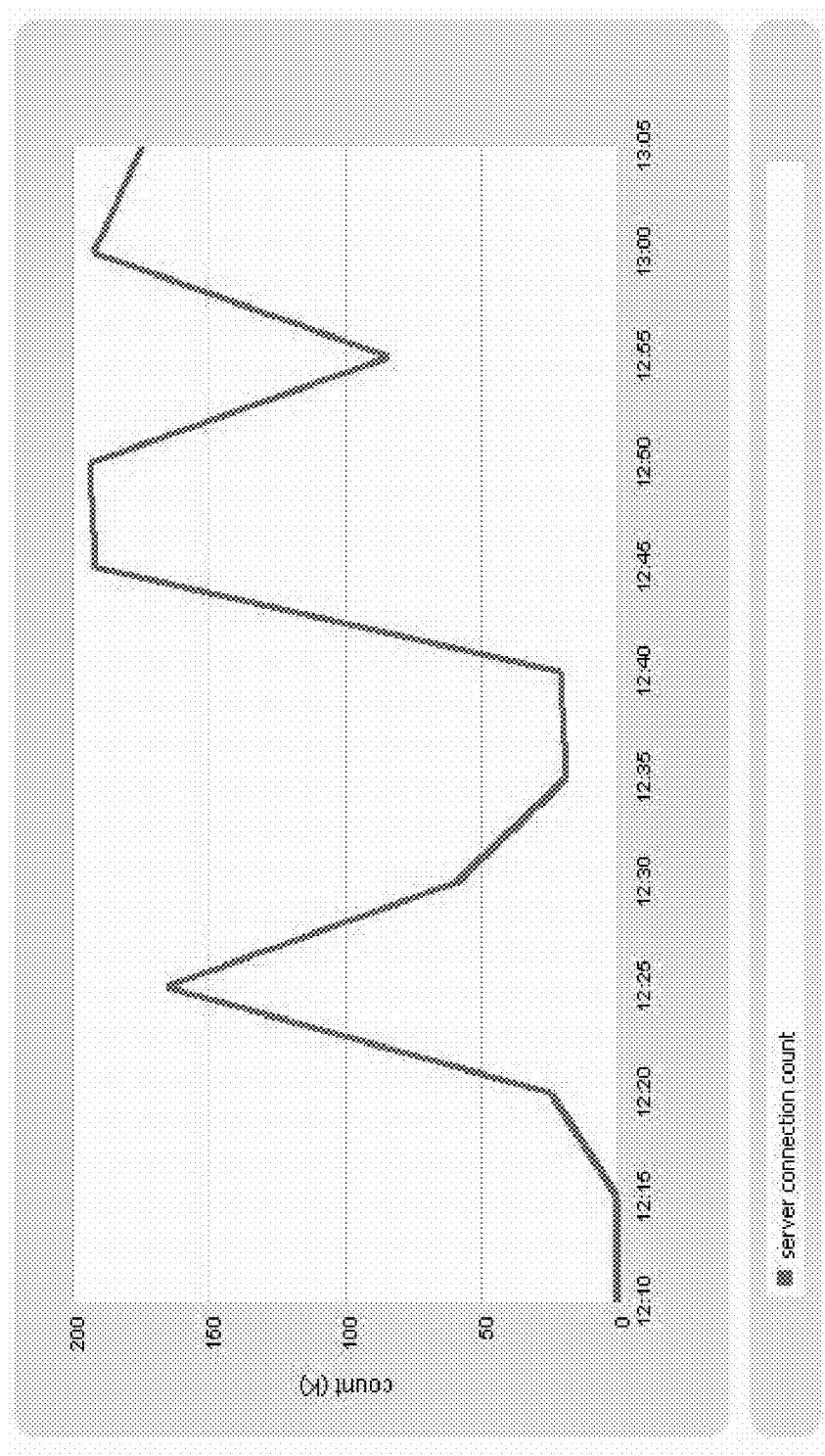
Figure 12E:
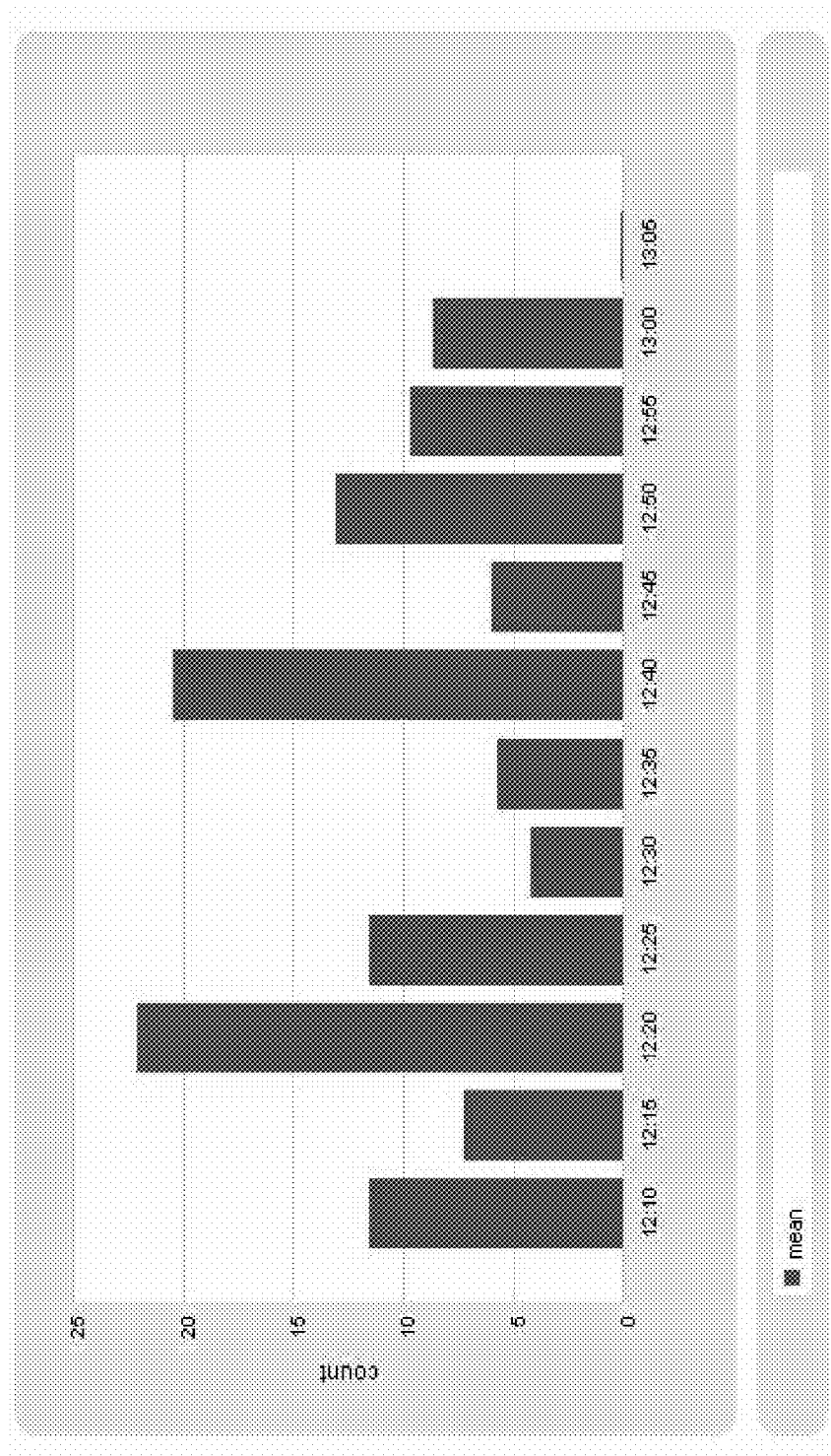

FIG. 11 is a block diagram illustrating an example reporting engine 131 of an apparatus for measurement, analysis, and optimization of content delivery. Reporting engine 131 may be comprised of a presentation manager 690, a configuration manager 700, an alarm manager 710, and a measure data manager 730. The function of the reporting engine is to accept requests or use a predetermined configuration to generate reports outlining the measurements collected by the apparatus.

In one embodiment, reporting engine 131 may periodically extract data from the data storage area and organize that data based on requested report types. This advantageously allows the reporting engine to spread its processor use out over a period of time. Advantageously, this eliminates the need for intensive processor use when generating the complete reports.

Presentation manager 690 is responsible for providing various views of the data contained in an apparatus for measurement, analysis, and optimization of content delivery.

Preferably, tabular and graphical views of data can be provided. These views present real-time, hourly, daily, weekly, monthly and yearly data to the user. The apparatus may provide these views using the hypertext markup language ("HTML"), and extensible markup language ("XML") technologies. Users may access these presentations with a common web browser application residing on a computer system or with alternative devices that have network access to the apparatus. Presentation manager 690 may also incorporates security mechanisms to ensure that only authorized users can gain access to the views presented. In one embodiment, presentation manager 690 may provide mechanisms by which users can configure and customize various aspects of both graphical and tabular reports.

Configuration manager 700 preferably allows one or more configuration files to be created, deleted, and modified. These configuration files are preferably used by reporting engine 131 to construct one or more customized reports containing the information desired by the administrator or user of the apparatus. In one embodiment, standard reports may include trend information and alarm threshold notifications.

Alarm manager 710 can monitor the data being collected by the system and compare the statistical output of the data collections to certain established thresholds. At any point in time when the statistical output of the data collections exceeds an established threshold for a particular metric, alarm manager 710 preferably takes the appropriate action.

Actions taken by the alarm manager can include simple notification of an administrator that the threshold has been exceeded. This notification may take place by merely writing a notice to a log file. Alternatively, alarm manager 710 may send an email to an administrator to effectuate notice. Additional methods of providing notice are also contemplated, for example alarm manager 710 may cause a page to be sent to the administrator.

In addition to providing notice that a threshold has been exceeded, alarm manager 710 may also proactively initiate steps to fix the problem. For example, alarm manager 710 may detect, through certain thresholds being exceeded, that the information server process has abnormally terminated. In such a case, alarm manager 710 may proactively initiate the appropriate steps for rebooting the information server machine, re-initializing the information server process, or both.

Measure data manager 730 is responsible for querying, extracting, filtering and formatting data for presentation manager 690 in an apparatus for measurement, analysis, and optimization of content delivery. Presentation manager 690 transmits requests to measure data manager 730 whenever a user action triggers the need to build a view for presentation. Preferably, a request can specify which measurements are required, and how the data should be queried and formatted. For example, a user can specify a query that generates a view displaying the slowest ten web pages on a web site. These queries provide users with the ability to interactively analyze and correlate the data contained in the data storage area. By performing extensive on-line analysis in this manner, the user is able to gauge all aspects of network performance, to troubleshoot current problems, and to perform proactive investigations aimed at preventing potential problems in the future.

FIGS. 12A-E are software application windows that illustrate example interfaces for presenting reports and information according to one embodiment of the present invention. These example windows are presented to show the rich value added by the characteristics of the particular presentations of the information collected by the apparatus.

Figure 13:
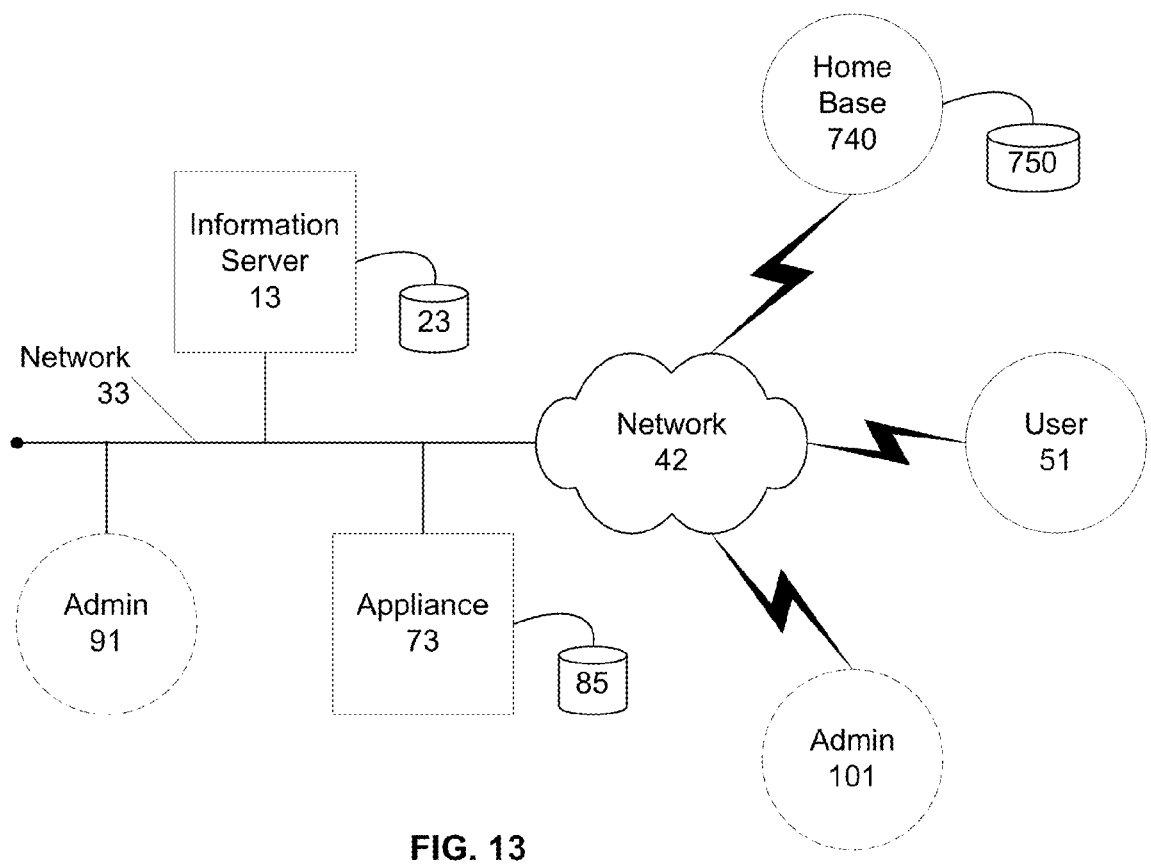
FIG. 13 is a block diagram illustrating an example system for measurement, analysis, and optimization of content delivery according to an embodiment of the present invention.

FIG. 13 is a block diagram illustrating an example system for measurement, analysis, and optimization of content delivery. The system may be comprised of an information server 13 coupled with a data storage area 23, an appliance 73 coupled with a data storage are 85, one or more users 51, and one or more administrators 91 and 101. Preferably, these components are communicatively coupled over one or more networks such as network 33 and network 42. Advantageously, appliance 73 can be physically located such that it sees all of the data traffic traveling on network 33 that is seen by information server 13.

Additionally, the system may include a home base 740 coupled with a data storage area 750. Preferably, home base 740 is communicatively coupled with appliance 73 over one or more networks such as network 42 and network 33. In one embodiment, the function of home base 740 can be to manage one or more remote appliances 73, and provide account validation and status monitoring services.

Figure 14:
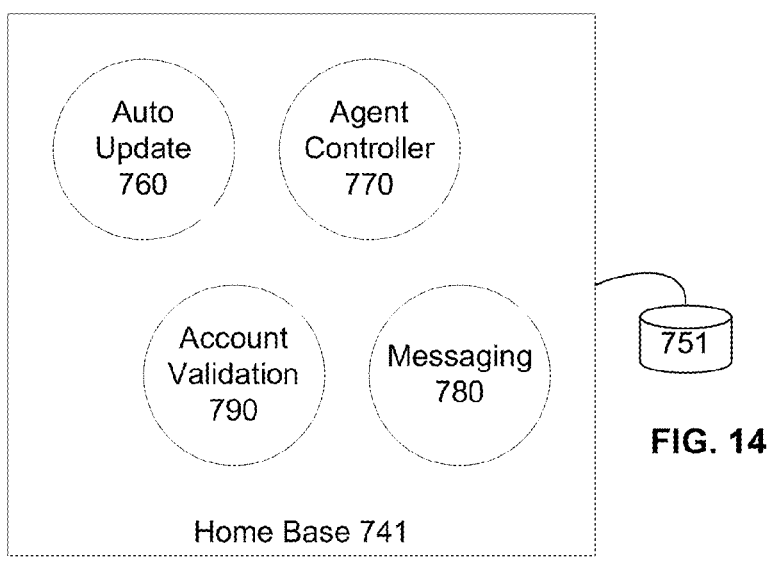
FIG. 14 is a block diagram illustrating an example home base component in a system for measurement, analysis, and optimization of content delivery according to an embodiment of the present invention.

FIG. 14 is a block diagram illustrating an example home base 741 in a system for measurement, analysis, and optimization of content delivery. Home base 741 may be comprised of an auto update module 760, an agent controller 770, a messaging module 780, and an account validation module 790. Additionally, home base 741 may preferably be configured with a data storage area 751.

Auto update module 760 may allow home base 741 to keep remote appliances up to date with the most current version of operational programs and data. For example, an appliance in communication with home base 741 may indicate that the appliance is running an older version of the appliance software. Advantageously, auto update module 760 can detect this and upgrade the appliance software over the network. Additionally, auto update module may determine if new appliance distribution files are necessary, and if so, transfer those files to the remote appliance.

Agent controller 770 preferably provides the home base 741 unit with remote control over the appliances in communication with home base 741. For example, agent controller 770 may transfer files to and from the remote appliance. Additionally, agent controller 770 may reboot a remote appliance.

Messaging module 780 preferably manages the receipt and sending of messages, files, and other data between home base 741 and any remote appliance. Upon receiving an incoming message, messaging module 780 preferably routes the message to the appropriate module within home base 741.

Account validation module 790 can function to verify account information related to particular customers that have an appliance in operation. For example, a remote appliance may send a status inquiry to home base 741 to determine if the customer account is up to date. Account validation module 790 preferably consults data storage area 751 and responds to the query.

Figure 15:
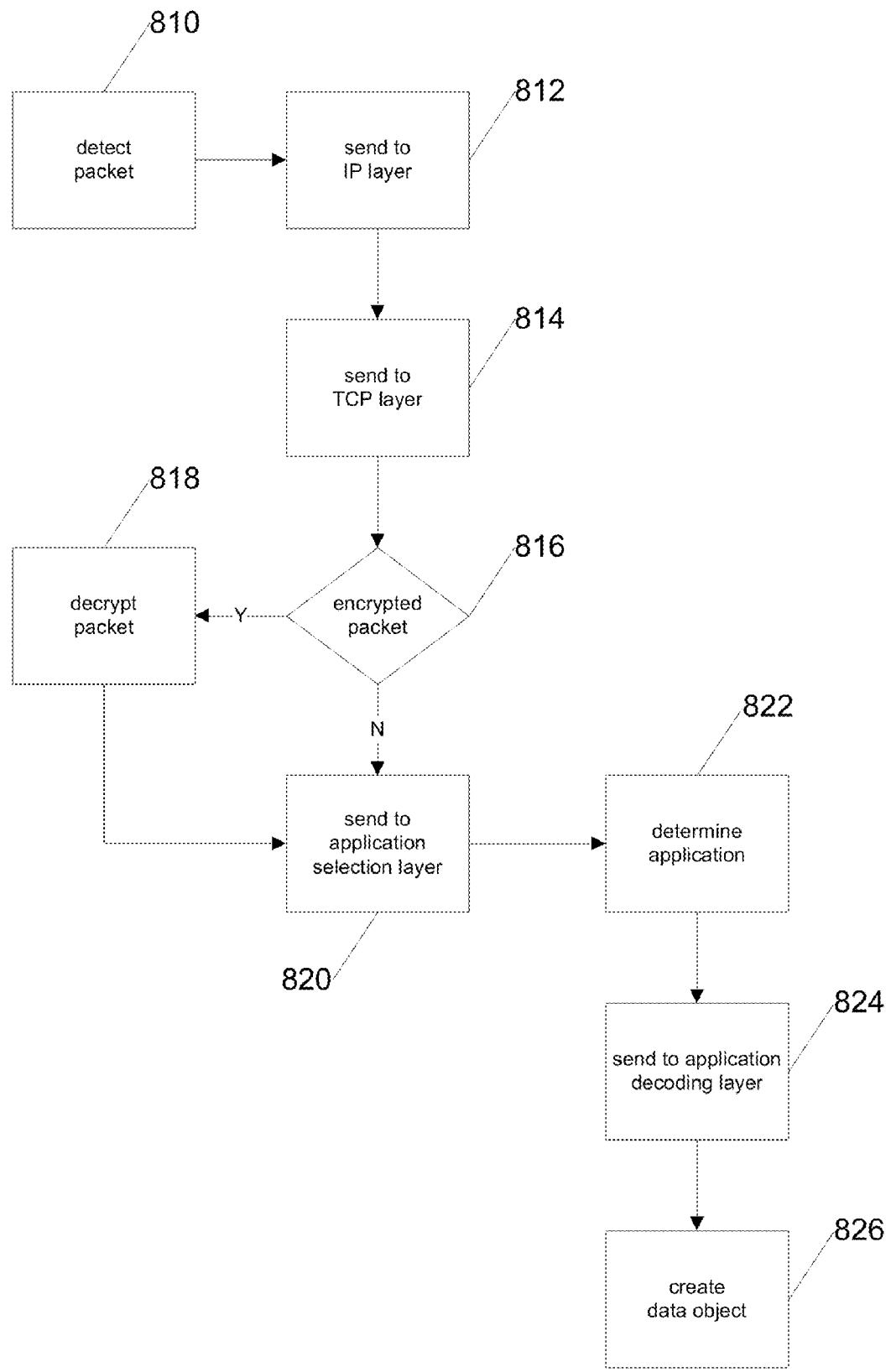
FIG. 15 is a flowchart illustrating an example process for processing data packets through a protocol stack according to an embodiment of the present invention.

FIG. 15 is a flowchart illustrating an example process for processing data packets through a protocol stack according to an embodiment of the present invention. Initially, in step 810 a packet is detected on the network. This function can be implemented by a packet detector. As will be understood by those skilled in the art various types of packet detectors may be employed. Preferably the packet detector is robust and is capable of detecting and reading each packet on the network.

In step 812 the packet is sent to the IP layer of the protocol stack. This may be done by the packet detector migrating data from its internal buffers into standard memory. Once in memory, the IP layer can process the data packets. Advantageously, the IP layer can process packets for more than one IP address, unlike conventional protocol stacks. Furthermore, the IP layer preferably passes additional information about the packets up the protocol stack for use in the higher levels. As shown in step 814, the IP layer passes the processed datagrams to the TCP layer.

The TCP layer processes the datagrams received from the IP layer. The TCP layer is also capable of handling datagrams for more than one IP address. In fact, the TCP layer advantageously can process datagrams for multiple connections between multiple clients and multiple servers. Furthermore, detail rich data relating to the requests for, delivery of, and processing of content can be passed from the TCP layer to the higher levels of the protocol stack, in addition to the data content.

Moreover, the TCP layer can detect if the data content is encrypted. If the content is encrypted, as determined in step 816, the message is sent to the SSL layer for decryption, as illustrated in step 818. Once decrypted, or if the data content was not encrypted, the message is sent to the higher levels of the protocol stock for further processing. Advantageously, the protocol stack can process messages for a variety of applications including HTTP web browsers, FTP, VoIP, VonD, streaming media, and the like. Therefore, messages from the TCP layer or unencrypted messages from the SSL layer are passed to an application selection layer, as shown in step 820.

The application selection layer preferably determines the application associated with the current message being processed and routes that message to the appropriate application decoding layer. For example, in step 822 the application selection layer determines what application is associated with the message. This may be carried out by examining the well known port number associated with the message. As previously described, well known port numbers are often associated with particular applications. Once the application has been determined, the message can be sent to the appropriate application decoding layer, as shown in step 824.

The application decoding layer may comprise one or more separate layers to process messages. Because each different application may use the underlying TCP connections in a variety of different ways, an application decoding layer will typically be unique for each specific application. Advantageously, this can be accommodated through the use of the application selection layer. Once the application decoding layer obtains an application message it preferably processes the message.

In the specific example of an HTTP web browser application, the application decoding layer may advantageously combine messages in a fashion that allows the application decoding layer to determine metrics relating to the actual experience of the end users. For example, a complete page download time may be determined by adding up the download times for each of the various components of a single web page.

The result of this type of processing by the application decoding is the creation of a data object that contains various data elements germane to the application and the application messages processed. The data object can then be associated with like data objects to ultimately provide metrics that describe in real terms relating to actual user experiences how the information server system is performing. Additionally, certain bottlenecks may be identified in the content delivery process such that the process may be continuously refined and improved.

Figure 16:
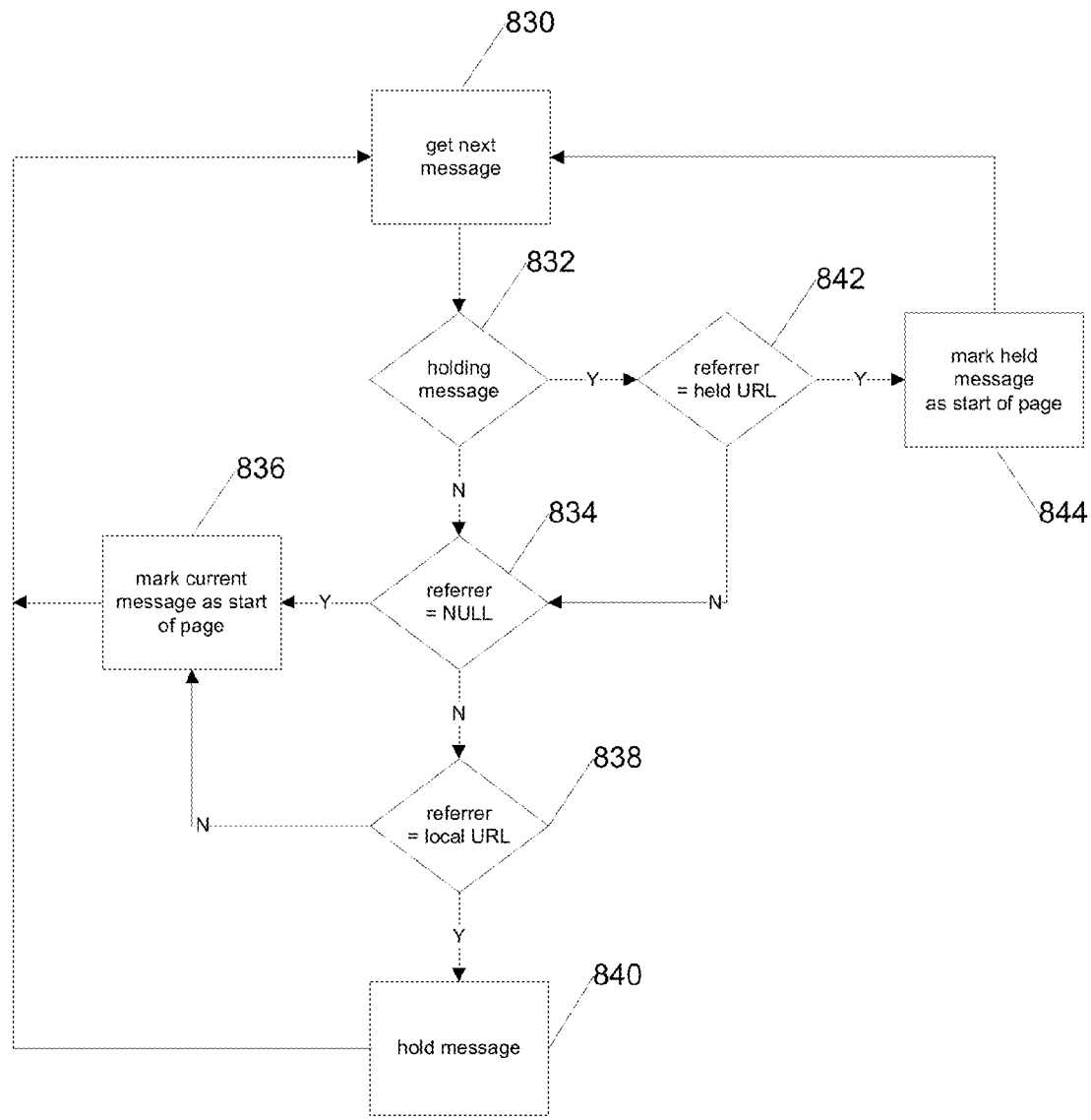
FIG. 16 is a flowchart illustrating an example process for identifying a page object from a set of application messages according to an embodiment of the present invention.

FIG. 16 is a flowchart illustrating an example process for identifying a page object from a set of application messages according to an embodiment of the present invention. Beginning with step 830, the continuous process obtains the next message in the stream of messages being received. Each message processed by the system is checked to determine if it may be the message that starts a new page object. In the stream of messages received and processed, a logical separation may be made between messages associated with a particular page. In order to determine this demarcation, each message in the stream must be reviewed.

When the next message is obtained, the URL data element in the message can be examined to determine if the message is from a client. If no URL data element exists, then the message can be excluded from the process. When a message with a URL data element is detected, the next step is to consult a message holding area to determine if a previous message is being held, as illustrated in step 832. If no previous message is being held, the system examines the REFERRER data element, which contains the URL of the referring web page. If the REFERRER data element is NULL, then the current message is the start of a new page, and the message can be marked as indicated in step 836.

If the REFERRER data element is not null, then the REFERRER data element is examined to determine if it contains a local URL. If the URL is not local, then the current message is the start of a new page, and the message can be marked as indicated in step 836.

If the URL is local, meaning that it references a local web page, then the message is stored in the message holding area because the examination of the message alone was inconclusive as to whether or not the message identified the start of a new web page. After holding the message, the process returns to step 830 and the next message is obtained. At this point, in step 832 a message is in the holding area so the REFERRER data element of the current message is examined. This value is compared to the URL data element of the held message. If the URL data element of the held message is the same as the URL contained in the REFERRER data element of the current message, then the held message is the start of a new page, and the held message can be marked as indicated in step 844.

If the REFERRER data element of the current message is not matched, then the REFERRER data element is examined to see if it is NULL. If the value is NULL, then the current message is the start of a new page, and the message can be marked as indicated in step 836.

If the REFERRER data element is not NULL, then the data element is examined to determine if the URL content refers to a local web page. If it does not, then the current is the start of a new page, and the message can be marked as indicated in step 836.

If the REFERRER data element does not contain a local web page URL, then the current message replaces the message in the holding area and the process continues. In this fashion, as the messages continuously pass through the system, they can be examined to logically differentiate the messages into discrete web pages. As will be understood by those skilled in the art, once the start of page has been identified, the end of the previous page has correspondingly been identified.

FIG. 17 is a flowchart illustrating an example process for routing a data object to a sub-analyzer according to an embodiment of the present invention. Initially, in step 850, the root analyzer receives the data object from the protocol stack. In step 852, the root analyzer determines the type of data object that has been received. For example, in one embodiment, the root analyzer may receive data objects of type session, connection, page, and page component. Once the type of data object has been determined, the root analyzer routes the data object to the one or more appropriate sub-analyzers, as shown in step 854. Depending on the type of application being monitored, there may be various different types of data objects in addition to various different types of sub-analyzers. Furthermore, the routing correlation between data objects and sub-analyzers may be unique for each separate application.

FIG. 18 is a flowchart illustrating an example process for populating a data storage area with cache data according to an embodiment of the present invention. The data populator provides the function of transitioning data out of the cache and into longterm storage. Although the populator does not write data to long term storage, it passes the data to a database manager that determines how and where to write the data. For example, the populator first reads data from the cache, as shown in step 860. Upon reading the data from the cache, the populator forwards the data to the database manager as illustrated in step 862.

Preferably, the populator process has less priority than the data collection process so at times reading step 860 may be postponed or delayed while the higher priority data collection process is executed. In one embodiment, the populator process may be periodically suspended and then re-activated in order to carry out its task.

FIG. 19 is a flow diagram illustrating an example process for switching data repositories during operation according to an embodiment of the present invention. As the database manager receives data from the populator, as described above with relation to FIG. 18, the database manager writes that data into longterm storage in the database. However, much of the data received by the database manager is short term data that has been collected to reflect real time metrics of the system being monitored.

Because the real time data is ultimately aggregated into hourly, daily, weekly, monthly, and yearly data, this real time data rapidly becomes obsolete. In order to manage the potentially exponential growth of the longterm data storage area, the database manager periodically purges the fastest growing databases. For example, the fastest growing databases may include the real time database, the hourly series database, and the daily series database. In one embodiment, the various longterm databases are not subject to such rapid growth because the potential number of database records is finite. For example, the hourly longterm database can typically have only 24 records, since there are only 24 hours in a day. Similarly, the weekly longterm database may have only 7 records, one for each day in the week. Although the data components of these records are updated through aggregation of data, the size of the actual database does not increase rapidly as in the series database instances because of the advantage of aggregation.

In order to efficiently purge the rapidly growing databases and to allow uninterrupted read access to the data in longterm storage, the database manager may employ two separate repositories for a single database. During time period 1, the active repository may be DB1, while the inactive repository may be DB2. At a predetermined switch time A, the database manager may delete any residual data in DB2 and set the active repository to be DB2. Any subsequent database writes during time period 2 are directed to this repository. Similarly, at a predetermined switch time B, the database manager may purge the data from repository DB1 and set the active repository to be DB1. This process may continue through additional time periods such as time period 3 and time period 4.

The predetermined switch times may also be configurable, as well as variable. For example, the predetermined switch time may be set for the time when the current repository reaches 99% of capacity. This advantageously can reduce the required number of repository changes and reduce the overall overhead of the database management system. Alternatively, the switch time may be appropriately set such that no data is purged from the inactive repository until enough time has passed to ensure that the detail included in the data has been aggregated into other long term storage, such as hourly longterm, daily longterm, or monthly longterm.

While the particular methods and appliance for measurement, analysis, and optimization of content delivery over a communications network herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. An apparatus for measuring, analyzing, and optimizing the delivery of content over a communications network having an information server communicatively coupled with a network appliance, the apparatus comprising:
    a network interface communicatively coupling the apparatus to the network;
    a packet detector configured to read a data packet from the network;
    a data analyzer configured to receive and combine a plurality of data packets into a datagram comprising content and additional information, combine a plurality of datagrams into an application message comprising content and additional information, identify an application related to the application message, and combine a plurality of application messages into a data object comprising a plurality of data elements;
    a root analyzer configured to determine the data object type and route the data object to a sub-analyzer; and
    a sub-analyzer configured to parse the data object into data elements and store the data elements in a data storage area.

2. The apparatus of claim 1, wherein the packet detector is further configured to passively read data packets from the network.

3. The apparatus of claim 1, wherein the additional information with the application message comprises a client network address and server network address combination.

4. The apparatus of claim 3, wherein application messages with the same client network address and server network address combination are identified as related.

5. The apparatus of claim 3, wherein the client network address comprises an internet protocol address and a port number and wherein the server network address comprises an internet protocol address and a port number.

6. The apparatus of claim 1, wherein the data object comprises a data element corresponding to an initial content request time and a data element corresponding to a completed content delivery time, the sub-analyzer further configured to determine a response time for delivery of the requested content.

7. The apparatus of claim 6, wherein the response time comprises a server response time.

8. The apparatus of claim 6, wherein the response time comprises a user-experienced response time.

9. The apparatus of claim 8, wherein the user-experienced response time comprises a server component and a network component.

10. The apparatus of claim 1, wherein the data elements stored in the data storage area are periodically aggregated.

11. A computer implemented method for aggregating data traversing a data communication network, the method comprising:
- detecting a data packet on the communications network;
- combining a plurality of data packets into an application message;
- identifying a plurality of related application messages;
- combining the plurality of related application messages into a data object comprising a plurality of data elements;
- storing the data object in a data storage area; and
- periodically aggregating like data objects in said data storage area.

12. The method of claim 11, wherein the detecting step comprises passively detecting the data packet on the communications network.

13. The method of claim 11, wherein identifying a plurality of related application messages further comprises determining a client network address and a server network address for each application message.

14. The method of claim 13, wherein identifying a plurality of related application messages further comprises identifying application with the same client network address and server network address as related.

15. A computer readable medium having stored thereon one or more sequences of instructions for causing one or more microprocessors to perform the steps for aggregating data traversing a data communication network, the steps comprising:
- detecting a data packet on the communications network;
- combining a plurality of data packets into an application message;
- identifying a plurality of related application messages;
- combining the plurality of related application messages into a data object comprising a plurality of data elements;
- storing the data object in a data storage area; and
- periodically aggregating like data objects in said data storage area.

16. The computer readable medium of claim 15, wherein the step for detecting a data packet comprises passively detecting the data packet on the communications network.

17. The method of claim 15, wherein the step for identifying a plurality of related application messages comprises determining a client network address and a server network address for each application message.

18. The method of claim 17, wherein the step for identifying a plurality of related application messages further comprises identifying application with the same client network address and server network address as related.

* * * * *